United States Patent
Park et al.

(10) Patent No.: US 11,163,621 B1
(45) Date of Patent: Nov. 2, 2021

(54) AUTOMATED API ACCESS USING MACHINE LEARNING

(71) Applicant: FUJITSU LIMITED, Kawasaki (JP)

(72) Inventors: Junhee Park, Okemos, MI (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/923,989

(22) Filed: Jul. 8, 2020

(51) Int. Cl.
*G06F 15/16* (2006.01)
*G06F 9/54* (2006.01)
*H04L 29/06* (2006.01)
*G06F 16/953* (2019.01)
*G06N 20/00* (2019.01)
*G06K 9/62* (2006.01)

(52) U.S. Cl.
CPC ........... *G06F 9/547* (2013.01); *G06F 16/953* (2019.01); *G06K 9/6256* (2013.01); *G06K 9/6267* (2013.01); *G06N 20/00* (2019.01); *H04L 63/0807* (2013.01); *H04L 67/40* (2013.01)

(58) Field of Classification Search
CPC ...................................................... G06F 9/547
USPC ........................................................ 709/223
See application file for complete search history.

(56) References Cited

U.S. PATENT DOCUMENTS

| 6,735,773 | B1 * | 5/2004 | Trinh ......................... G06F 9/54 709/229 |
| 9,479,509 | B2 | 10/2016 | Zeuthen |
| 9,602,482 | B1 | 3/2017 | Roth et al. |
| 9,654,469 | B1 | 5/2017 | Yang |
| 10,133,650 | B1 | 11/2018 | Park et al. |
| 10,592,302 | B1 * | 3/2020 | Hinrichs ................... G06F 9/54 |
| 10,693,644 | B2 * | 6/2020 | Kozma .................... G06F 21/33 |
| 10,693,795 | B2 | 6/2020 | Chen et al. |
| 11,023,359 | B2 * | 6/2021 | Rodriguez ................ G06F 8/38 |
| 11,030,084 | B2 * | 6/2021 | Battaglia ............. G06F 11/3664 |
| 2003/0154375 | A1 * | 8/2003 | Yang ..................... G06Q 20/341 713/172 |
| 2013/0275504 | A1 * | 10/2013 | Patel ...................... G06Q 10/10 709/204 |
| 2015/0095923 | A1 * | 4/2015 | Sarid ......................... G06F 8/30 719/328 |
| 2020/0311093 | A1 * | 10/2020 | Rathod .................... H04L 67/10 |
| 2020/0341826 | A1 * | 10/2020 | Ge .......................... G06F 9/448 |

(Continued)

FOREIGN PATENT DOCUMENTS

JP 2019139621 A * 8/2019 ............. G06F 21/33

OTHER PUBLICATIONS

Enabling Automatic Discovery and Querying of Web APIs at Web Scale using Linked Data Standards https://doi.org/10.1145/3308560.3317073 Published:May 13, 2019 (Year: 2019).*

*Primary Examiner* — Hamza N Algibhah
(74) *Attorney, Agent, or Firm* — Maschoff Brennan

(57) ABSTRACT

A method may include iterating over multiple application programming interfaces (APIs) to extract an authentication type for the multiple APIs. The method may also include, from a central repository, automatically registering a new user for access to a given API of the multiple APIs. The method may additionally include obtaining authentication data based on an authentication type for the given API, and storing the authentication data. The method may also include accessing the given API using the stored authentication data.

20 Claims, 17 Drawing Sheets

(56) References Cited

U.S. PATENT DOCUMENTS

2020/0394082 A1\* 12/2020 Schreiner .............. G06F 16/958
2021/0160231 A1\* 5/2021 Kumar .................. H04L 63/083

\* cited by examiner

AUTOMATED API ACCESS USING MACHINE LEARNING

FIELD

Embodiments of the present disclosure relate to automated application programming interface (API) access using machine learning.

BACKGROUND

APIs are a convenient mechanism by which functionality at a remote location may be accessed and/or incorporated into a software project. However, a large number of APIs have been introduced, which can make it difficult to select which API a software developer will use in their project.

SUMMARY

One or more embodiments of the present disclosure may include a method that includes iterating over multiple application programming interfaces (APIs) to extract an authentication type for the multiple APIs. The method may also include, from a central repository, automatically registering a new user for access to a given API of the multiple APIs. The method may additionally include obtaining authentication data based on an authentication type for the given API, and storing the authentication data. The method may also include accessing the given API using the stored authentication data.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
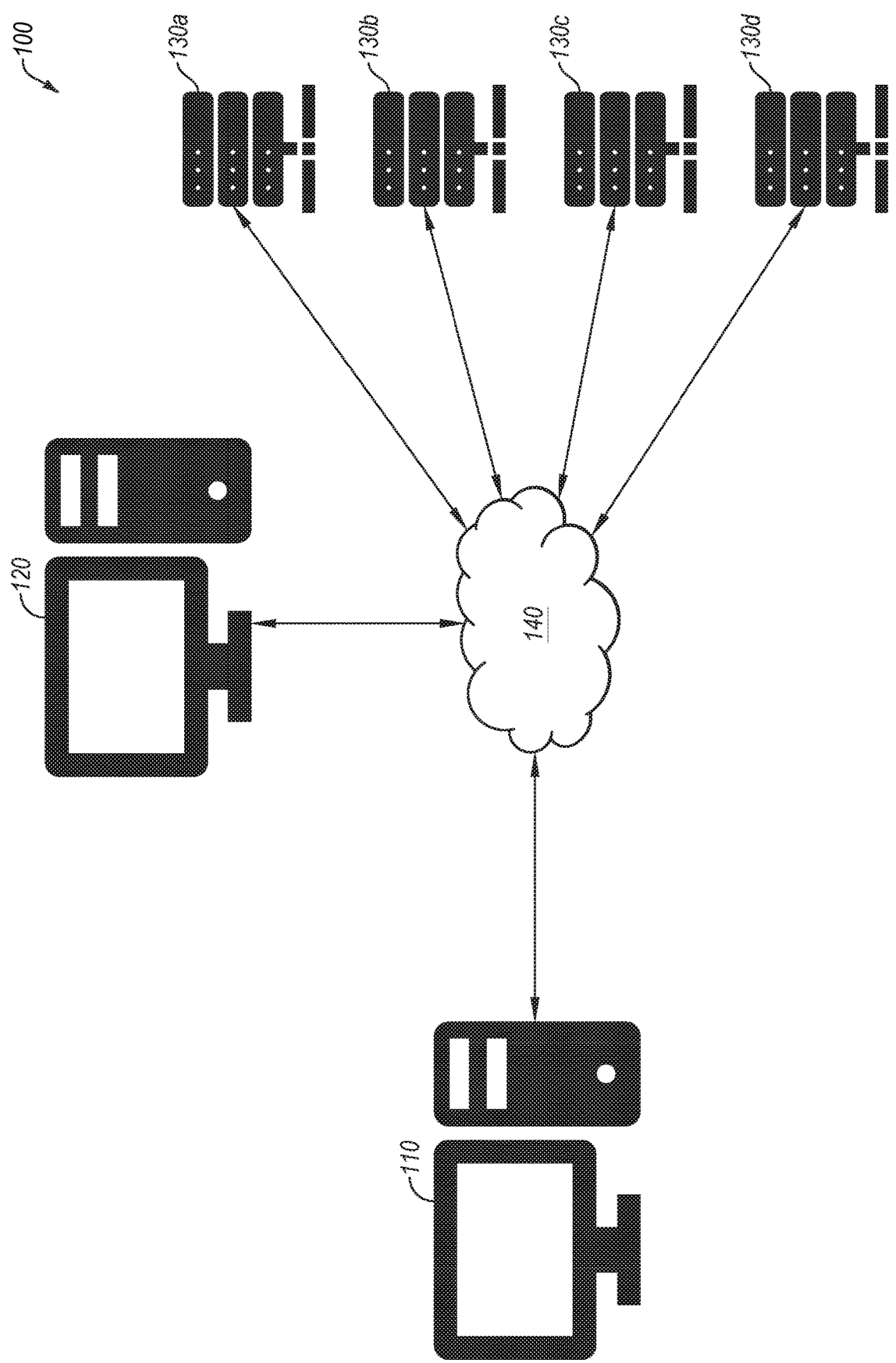
FIG. 1 is a diagram illustrating an example system for automated API access using machine learning.

The present disclosure relates to automated access to APIs using machine learning. For example, API marketplaces often collect a variety of APIs that can be compared and reviewed. However, granting access to each of the individual APIs is typically controlled by the API host, and is not standardized or uniform. While reference is made to an API host, the API host may refer to an entity or computing system that developed, hosts, and/or otherwise controls access to a given API. By way of example in the variety of potential access restrictions, one API host may require the creation of an account using one set of information, and may require the user to then login to the created account at the API host system to retrieve credentials to access an API-key; while another API host may require the creation of an account using a different set of information, and may require the registration of a particular project with the API host before access to credentials is granted; and another API host may require a request accompanied by personal information to obtain credentials to access an API. Because of the variety of ways in which access is limited to the various APIs, a significant overhead may be placed on the development process when using APIs, as selecting or sampling different APIs may require significant work to go to each of the different API hosts' sites, acquire access, etc. This overhead can be particularly burdensome when trying to select an API from several options, where the process is repeated for each API that is to be sampled. Furthermore, for API marketplaces that attempt to gather such information, the access requirements and/or process may change for various APIs, such that even gathered information may be outdated or incorrect. Additionally, the credentials for accessing an API may have a short shelf-life such that even if an API marketplace acquired credentials once, by the time a user of the marketplace attempted to access the API, the credentials may be outdated which can again require visiting the site of the API host to refresh the credentials.

To streamline granting access, the present disclosure includes an API platform that may provide automatic user registration with various APIs, may automatically acquire credentials for accessing the APIs (including for OAuth and/or API-key authentication approaches), and may utilize the pre-registered API-key or renew the OAuth access token such that the user may quickly access and sample an API. As used herein, the term OAuth includes OAuth 2.0 as well as previous and/or future versions of OAuth, such as 1.0, 1.1, etc. Each of these processes may be automated and may utilize machine learning or other intelligent systems to navigate the variations among API hosts for granting access to the various APIs and may occur without or with only limited user input.

In some circumstances, embodiments of the present disclosure may facilitate improvement in the performance of a computer by applying the teachings of the present disclosure. For example, by providing a single system that may intelligently traverse and acquire access to multiple different APIs of different API hosts that can be accessed from a single interface. Additionally, this may reduce overhead in software development by removing significant effort that must otherwise be expended in retrieving the access credentials manually from each API host. Furthermore, the present disclosure may permit the performance of tasks by a computing system that were not possible before, namely, the automated acquisition of API access credentials and the renewal thereof from a single interface. As another example, the present disclosure may permit an API platform according to at least some embodiments of the present disclosure may operate as a proxy for users in interacting with multiple API hosts.

One or more example embodiments are explained with reference to the accompanying drawings.

FIG. 1 is a diagram illustrating an example system 100 for automated API access using machine learning, in accordance with one or more embodiments of the present disclosure. The system 100 may include a client 110, an API platform 120, and one or more API hosts 130 (such as the API hosts 130a, 130b, 130c, and/or 130d), all of which may communicate over a network 140. The client 110 may access the API platform 120 to view, consider, and/or analyze various APIs, such as APIs 132 (such as the APIs 132a, 132b, 132c, and/or 132d) hosted by the API hosts 130. The API platform 120 may automatically grant a user of the client 110 access to one or more of the APIs 132 via the API platform 120 without requiring the client 110 to directly contact the API hosts 130. Examples of the automated process to granting access to various APIs may be described more fully with reference to FIGS. 2-12E.

The client 110 may include any computing device or system that may utilize an API. In some embodiments, the user of the client 110 may be a software developer that is looking at multiple APIs to decide which to incorporate into their software project. In some embodiments, the user of the client 110 may be a novice user who is exploring different APIs via the API platform 120 without much experience. In each of these embodiments, the API platform 120 may be capable of providing access to the various APIs 132 hosted by the API hosts 130.

The API platform 120 may include any system(s), device(s), or combinations thereof that provide access and/or insight into the APIs 132. For example, the API platform 120 may include a marketplace via which users of the client 110 may search for certain functionalities, developers, etc. when looking to incorporate an API into a particular software project, web site, etc. In some embodiments, the API platform 120 may operate as an API marketplace or central repository from which users may select from, peruse, or otherwise observe, sample, or obtain multiple APIs. In some embodiments, the API platform 120 may be configured to traverse, crawl, or otherwise access the API hosts 130 to acquire and/or obtain information regarding the APIs 132 hosted by the API hosts 130. In some embodiments, the API platform 120 may utilize machine learning approaches in performing its functions, for example, as described with reference to FIGS. 2-12E.

The API hosts 130 may include any system(s), device(s), or combinations thereof that host the APIs 132. A given API host 130 may be configured to host multiple contents, such as pages or sites, related to a respective API 132. For example, the API host 130 may include a sign-up page via which a user may sign up to receive access to the API 132; a sign-in page via which the user may sign in to an account associated with the API 132 to obtain information, credentials, etc. related to the API 132; a landing page upon which a user arrives after signing in; an API-key page upon which an API key is stored for the user; an API documentation page which may include information regarding the capabilities of the API 132, the inputs of the API 132, the outputs of the API 132, the locations of other pages associated with the API 132, an authentication type for the API 132, etc.; a home page associated with the API host 130 and/or the API 132; and/or any other pages associated with the API 132 and/or the API host 130. In some embodiments, the API host 130 may be a developer of the API 132, or may be a third party that hosts the API 132 and/or associated information and/or pages related to the API 132.

The network 140 may include any device, system, component, or combination thereof configured to provide communication between one or more of the client 110, the API platform 120, and/or the API hosts 130. By way of example, the network 140 may include one or more wide area networks (WANs), local area networks (LANs), etc. In some embodiments, the network 140 may include the Internet, including a global internetwork formed by logical and physical connections between multiple WANs and/or LANs. Alternately or additionally, the network 140 may include one or more cellular RF networks and/or one or more wired and/or wireless networks such as, but not limited to, 802.xx networks, Bluetooth® access points, wireless access points, IP-based networks, or the like. The network 140 may also include servers, substations, or other connection devices that enable one type of network to interface with another type of network. Additionally or alternatively, the network 140 may include an Intranet, or one or more computing devices in communication within an organization or in an otherwise secure manner.

Modifications, additions, or omissions may be made to the system 100 without departing from the scope of the present disclosure. For example, in some embodiments, the system 100 may include any number of other components that may not be explicitly illustrated or described. As another example, while four API hosts 130 are illustrated, any number, such as hundreds, thousands, or more, are contemplated.

FIGS. 2-11 illustrate various flowcharts of various example methods in accordance with the present disclosure. One or more operations of the various methods illustrated in FIGS. 2-11 may be performed by a system or device, or combinations thereof, such as the client 110, the API platform 120, and/or the API hosts 130, and/or the computing system 1300 of FIG. 13. Although illustrated as discrete blocks, various blocks of the methods illustrated in FIGS. 2-11 may be divided into additional blocks, combined into fewer blocks, or eliminated, depending on the desired implementation.

Figure 2:
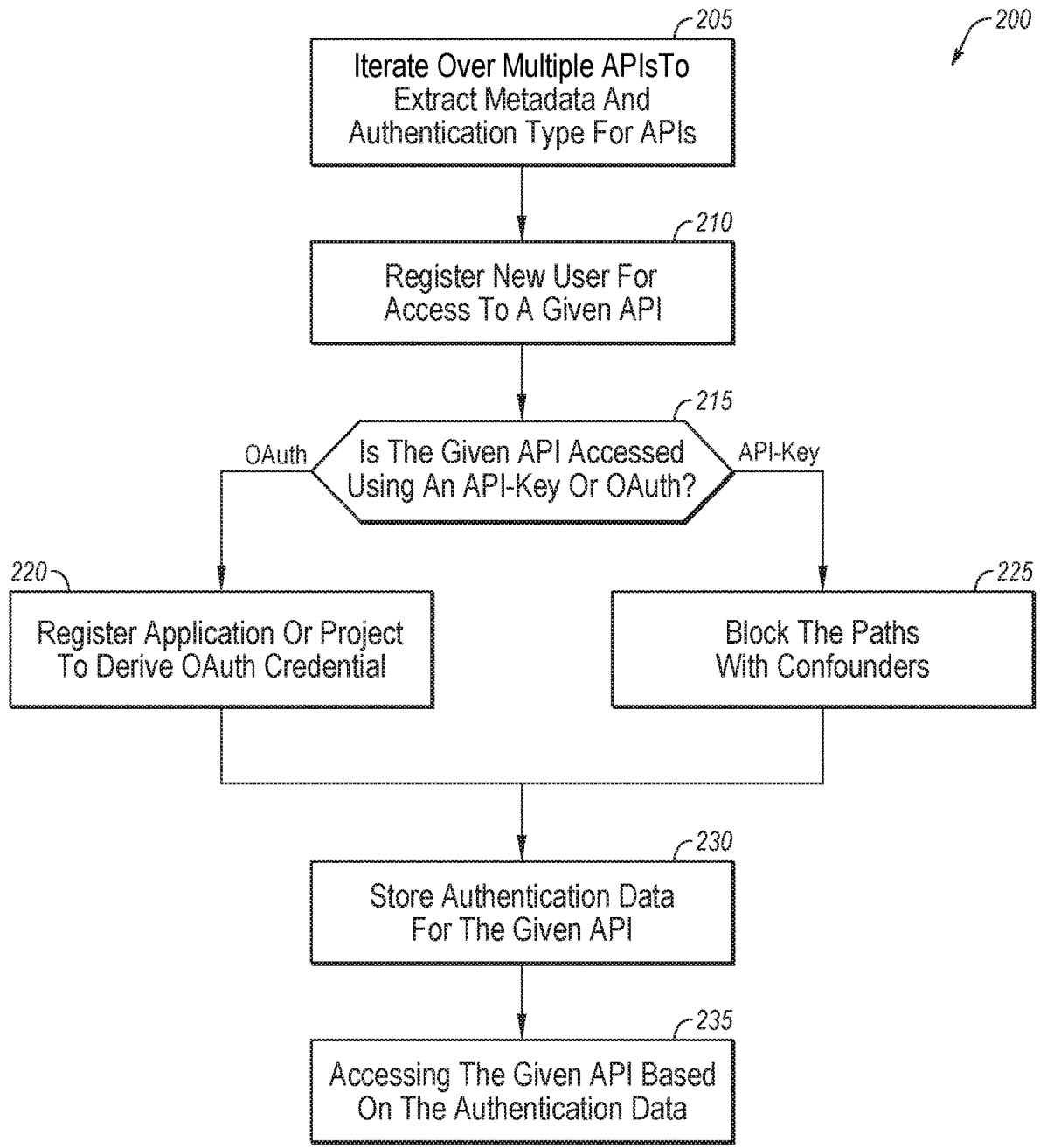
FIG. 2 illustrates an example flowchart of an example method of automated API access using machine learning.

FIG. 2 illustrates an example flowchart of an example method 200 of automated API access using machine learning, in accordance with one or more embodiments of the present disclosure. For example, FIG. 2 may illustrate an example of the operations that may be undertaken by an API platform (such as the API platform 120 of FIG. 1) to provide access to an API to a client (such as the client 110 of FIG. 1).

At block 205, the API platform may iterate over multiple APIs to extract metadata and/or an authentication type for each of the multiple APIs. For example, the API platform may crawl, traverse, hypertext markup language (HTML) scrape, etc. an API documentation page or other source of information for each of the APIs, such as one or more API repositories or other services that aggregates information regarding APIs. To do so, the API platform may or may not interact with multiple different API hosting servers. Additionally or alternatively, to perform such tasks the API platform may utilize a web automation tool, such as Selenium. In some embodiments, when iterating over the APIs, the API platform may obtain information indicating what type of authentication the API uses, such as OAuth, an API-key, etc. Additionally or alternatively, the API platform may obtain a title of a given API, the host of the given API (such as the IP address of the host, the entity name of the host, etc.), a location of an API documentation page (such as the uniform resource locator (URL) of the documentation page), etc. In some embodiments, certain input data sets may be prepared to facilitate user registration and/or the authentication classification.

At block 210, a new user may be registered with an API to facilitate access to a given API. For example, the API platform may automatically create and register an account for the new user. In some embodiments, the API platform may automatically identify and/or fill in forms for a sign-up page of the API. Additionally or alternatively, the API platform may automatically sign in to the API to verify the account creation. Some examples of the operations of the block 210 may be illustrated and described in greater detail with reference to FIG. 3 (an example of registering a new user account), FIG. 4 (an example of identifying a sign-up page for a given API using a search engine-based approach), FIG. 5 (an example of generating and/or training a model for a machine learning system), FIG. 6 (an example of identifying a sign-up page for a given API using a machine learning based approach), FIG. 7 (an example of automatically filling in forms of a sign-up page), and/or FIG. 8 (an example of automatically identifying a sign-in page).

At block 215, a determination may be made as to whether the given API is accessed using an API-key or OAuth (e.g., OAuth 2.0) as the authentication type. For example, the API platform may obtain information regarding the type of authentication via the traversing at block 205. If it is determined that the authentication type is OAuth, the method 200 may proceed to the block 220. If it is determined that the authentication type is an API-key, the method 200 may proceed to the block 225.

Figure 9:
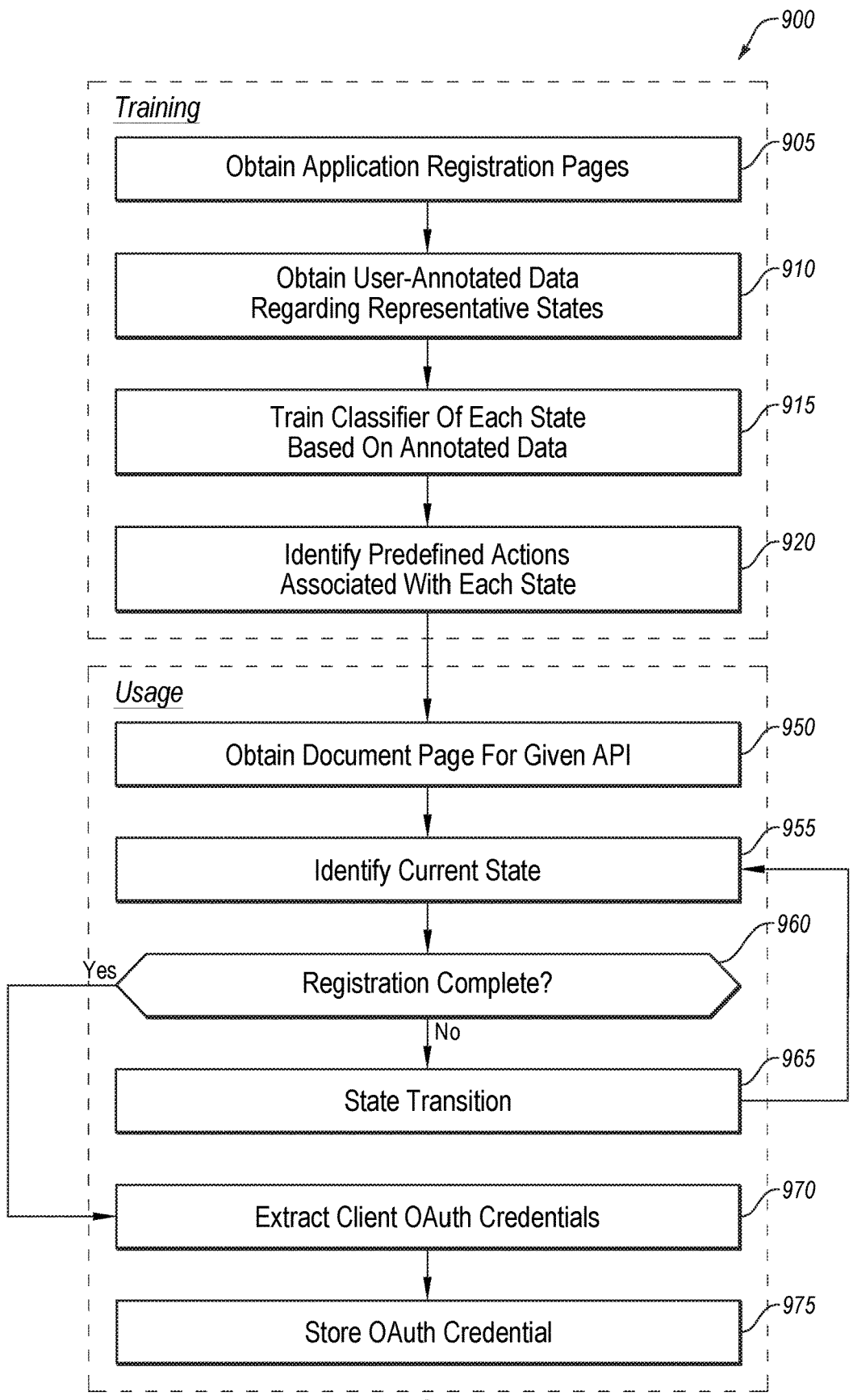
FIG. 9 illustrates an example flowchart of an example method of registering an application.

At block 220, an application or project may be registered with the API host to derive an OAuth credential. For example, the API platform may identify and access an API registration page and may automatically traverse the process to register a project with the API host. Upon registering the application or project, the API platform may obtain information such as a client identifier, a client secret, etc. that may be used as the OAuth credential. Additionally or alternatively, an OAuth authorization code may be obtained as the OAuth credential. An example of a process the API platform may utilize to register an application or project is illustrated in FIG. 9.

Figure 10:
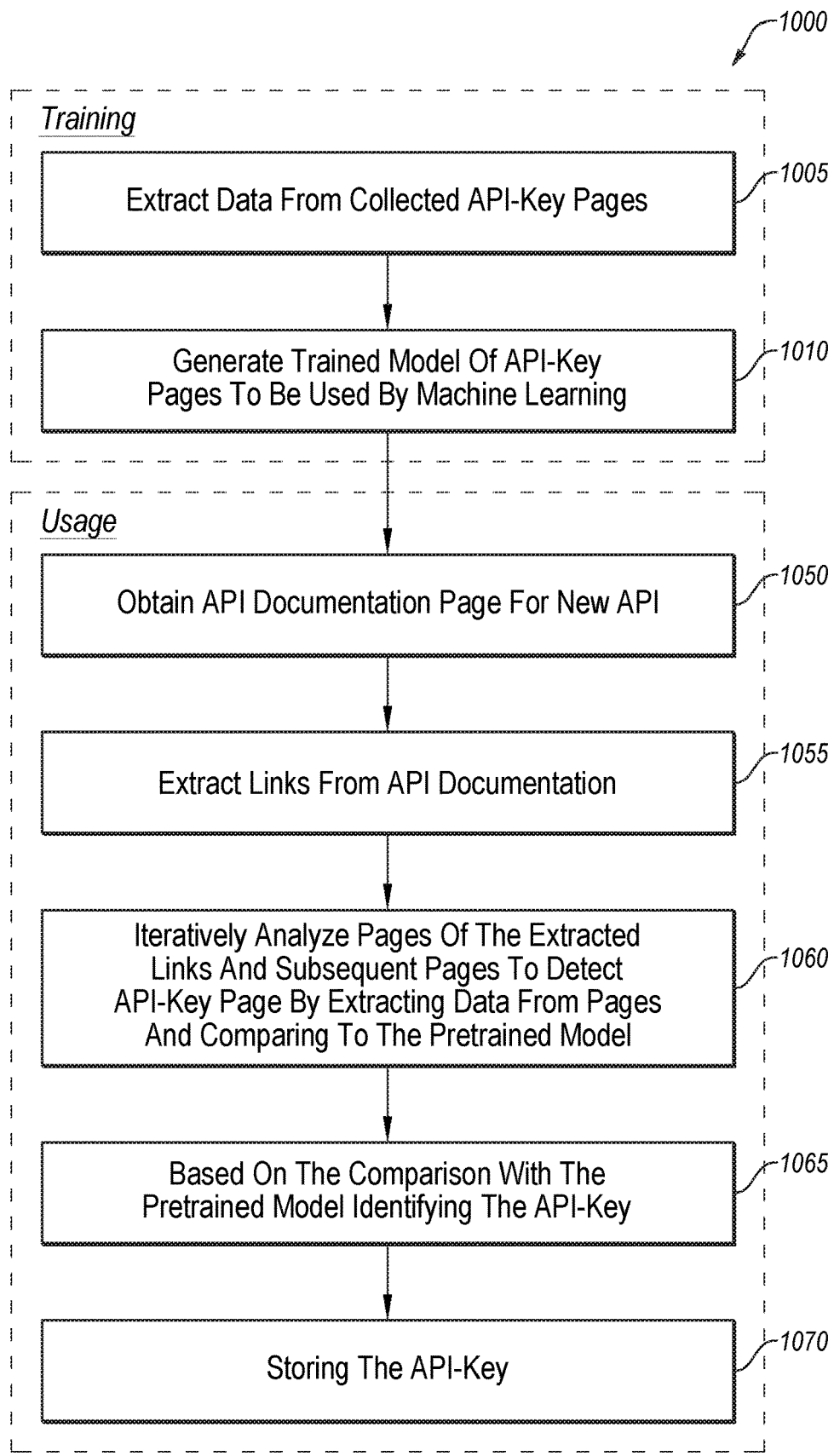
FIG. 10 illustrates an example flowchart of an example method of extracting an API key.

At block 225, the API-key may be extracted. For example, the API platform may sign-in to the API host and may automatically traverse the pages of the API host to arrive at an API-key page. The API-key may be extracted from the API-key page, for example, by identifying a certain HTML element and extracting the associated text and/or element. An example of a process the API platform may utilize to extract an API-key is illustrated in FIG. 10.

Figure 11:
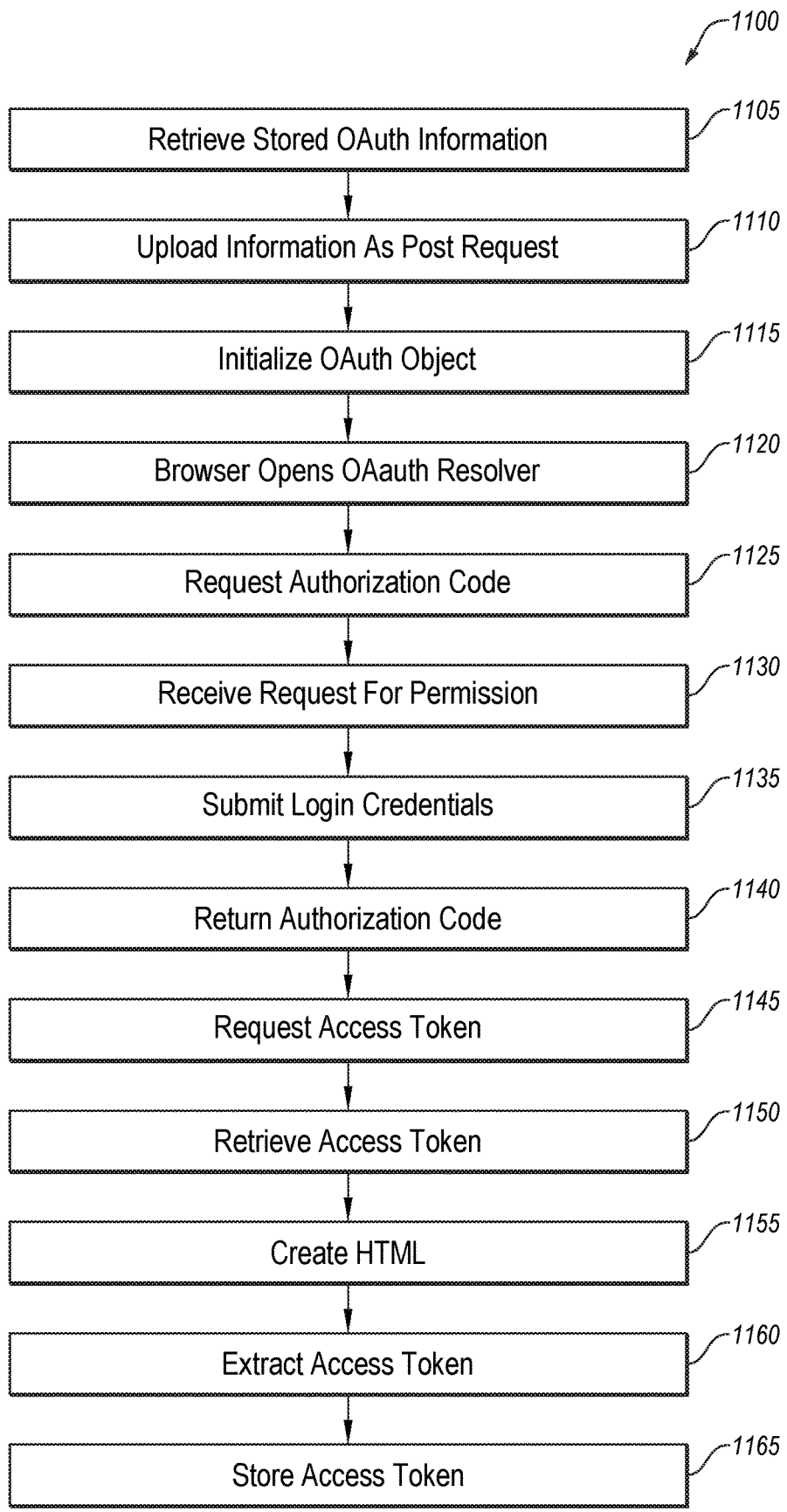
FIG. 11 illustrates an example flowchart of an example method of resolution and/or renewal of OAuth credentials.

At block 230, authentication data may be stored for the given API. For example, the API platform may store the API-key. As another example, the API platform may store the client identifier and/or the client secret. As a further example, the API platform may store the OAuth authorization code. In these and other embodiments, the API platform may utilize the OAuth authorization code, the client identifier, and/or the client secret to obtain and/or renew an OAuth access token which may be stored as the authentication data. An example of a process the API platform may utilize to obtain and/or renew an OAuth access token is illustrated in FIG. 11.

At block 235, the given API may be accessed based on the stored authentication data. For example, a user, via the API platform, may access the given API using the API-key, OAuth access token, etc. such that the user may utilize the API. In some embodiments, such access may be obtained using sample data such that the user may sample the API when deciding whether or not to subscribe or otherwise more enduringly select the API for usage. In these and other embodiments, the user may be able to be granted access to the given API without personally visiting the pages of the API hosts. For example, the API platform may automatically access the API host sites to obtain authentication data such that the user is able to access the API.

Figure 3:
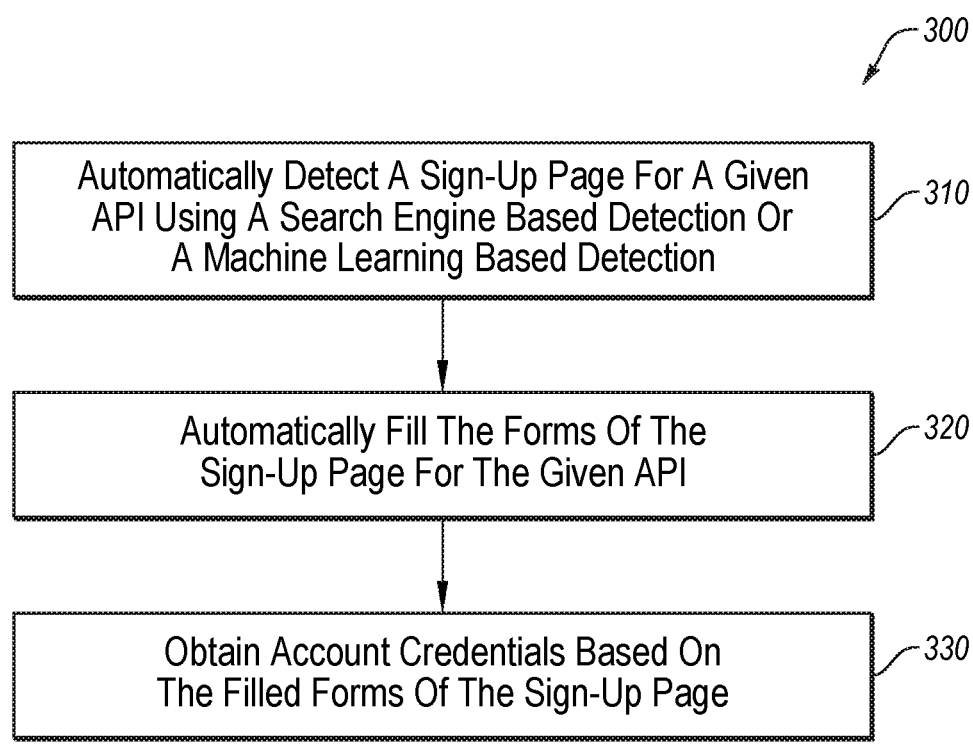
FIG. 3 illustrates an example flowchart of an example method of registering a new user.

FIG. 3 illustrates an example flowchart of an example method 300 of registering a new user, in accordance with one or more embodiments of the present disclosure. FIG. 3 is an example of a process utilized by an API platform to register a new user with an API host.

Figure 6:
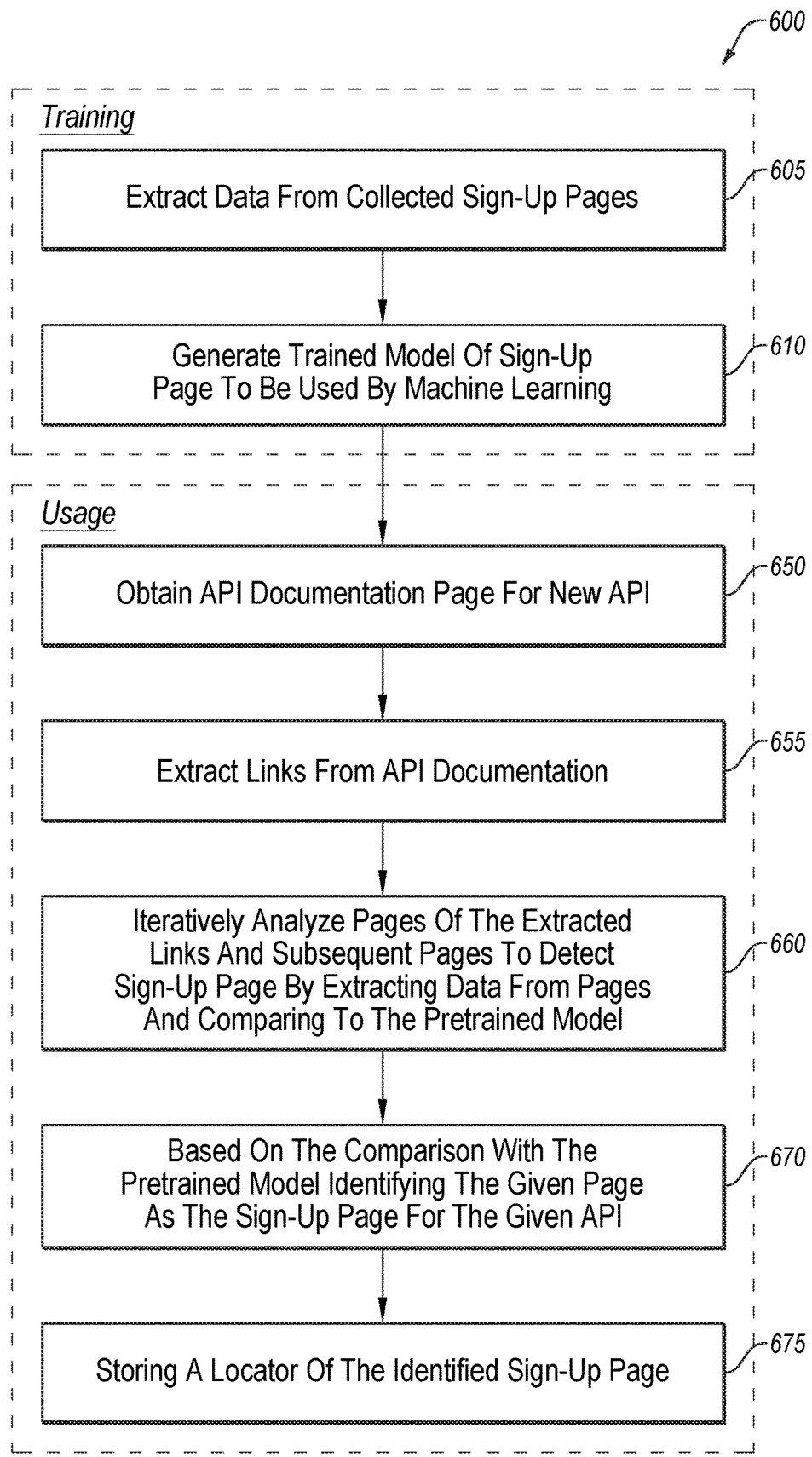
FIG. 6 illustrates an example flowchart of an example method of a machine learning-based approach to identifying a sign-up page.

At block 310, a sign-up page for a given API may be automatically detected using a search engine-based detection or a machine learning based detection. For example, the API platform may utilize a search engine-based detection or a machine learning based detection based on API documentation data or other obtained data (such as that obtained at block 205 of FIG. 2) to determine a location for a sign-up page for the given API. In some embodiments, the search engine-based detection may be utilized if the machine learning approach fails to identify the sign-up page for a given API. Additionally or alternatively, the search engine-based detection may be used to identify sample sign-up pages to be used in training for the machine learning-based detection. In some embodiments, the machine learning-based detection may use the API documentation page as a starting point and may traverse pages using a breadth first search (BFS) approach and a pre-trained model to find a sign-up page. An example of a search engine-based detection approach is illustrated in FIG. 4, and an example of a machine learning-based detection approach is illustrated in FIG. 6.

Figure 7:
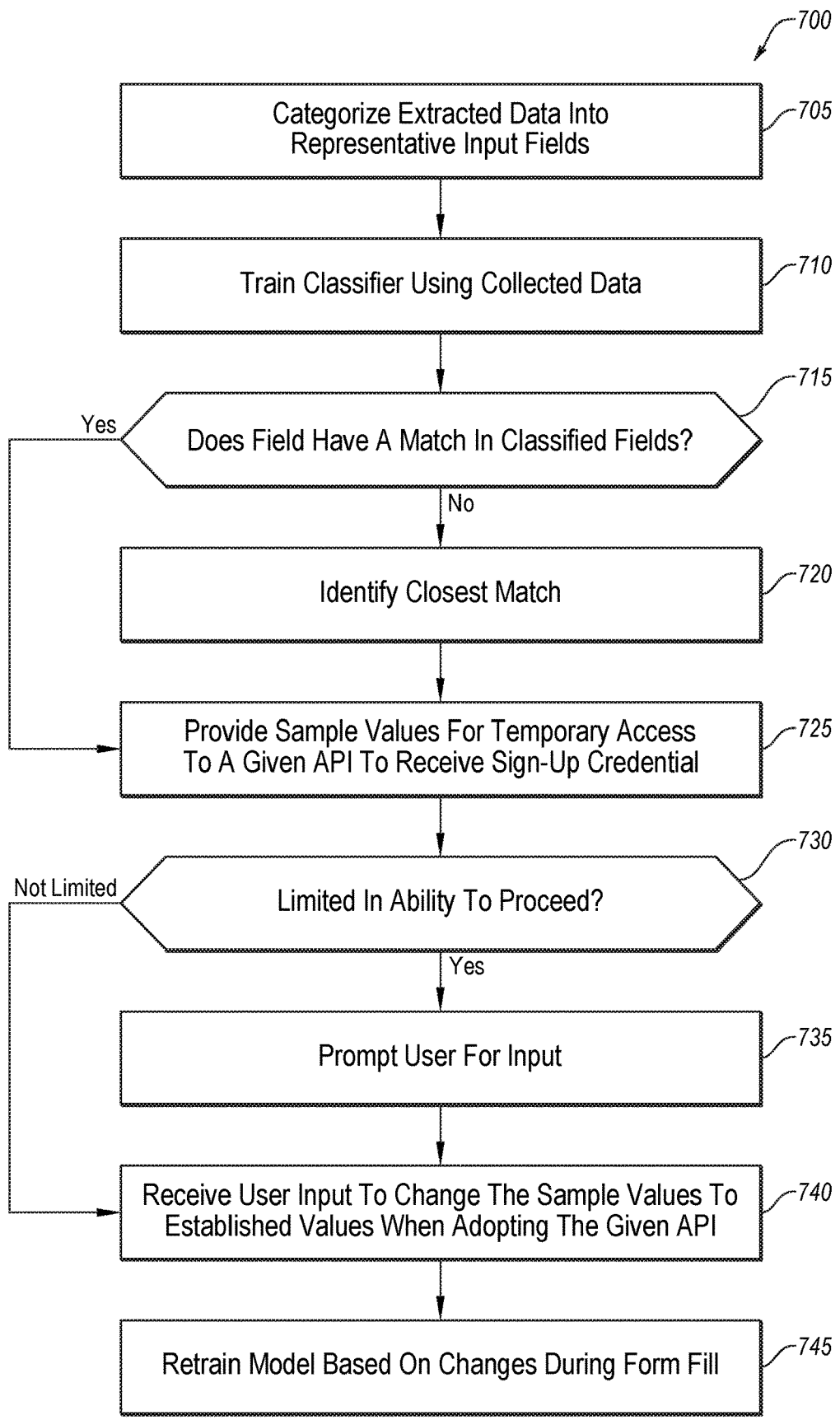
FIG. 7 illustrates an example flowchart of an example method of automatically filling in sign-up forms of a sign-up page.

At block 320, form fields of the sign-up page for the given API may be automatically filled. For example, the API platform may automatically traverse the form fields, identify appropriate data, and input the appropriate data into the form fields. In some embodiments, the data that is input may be data specific to the user that they previously provided to the API platform. Additionally or alternatively, the API platform may utilize generic, random, or other sample data such that the input information is not explicitly tied to the user (e.g., user name=hello; email=hello@hello.com). An example of a process the API platform may utilize to automatically fill in the fields of the sign-up page is illustrated in FIG. 7.

At block 330, account credentials may be obtained based on the filled forms of the sign-up page. For example, after filling in all of the form fields on the sign-up page for the given API, the account credentials may be obtained for an account with the given API. In some embodiments, the account credentials may be one or more of the fields filled on the sign-up page. In some embodiments, the account credentials may be retrieved from an email account via a communication from the API host of the given API in response to the form fields being filled.

Figure 4:
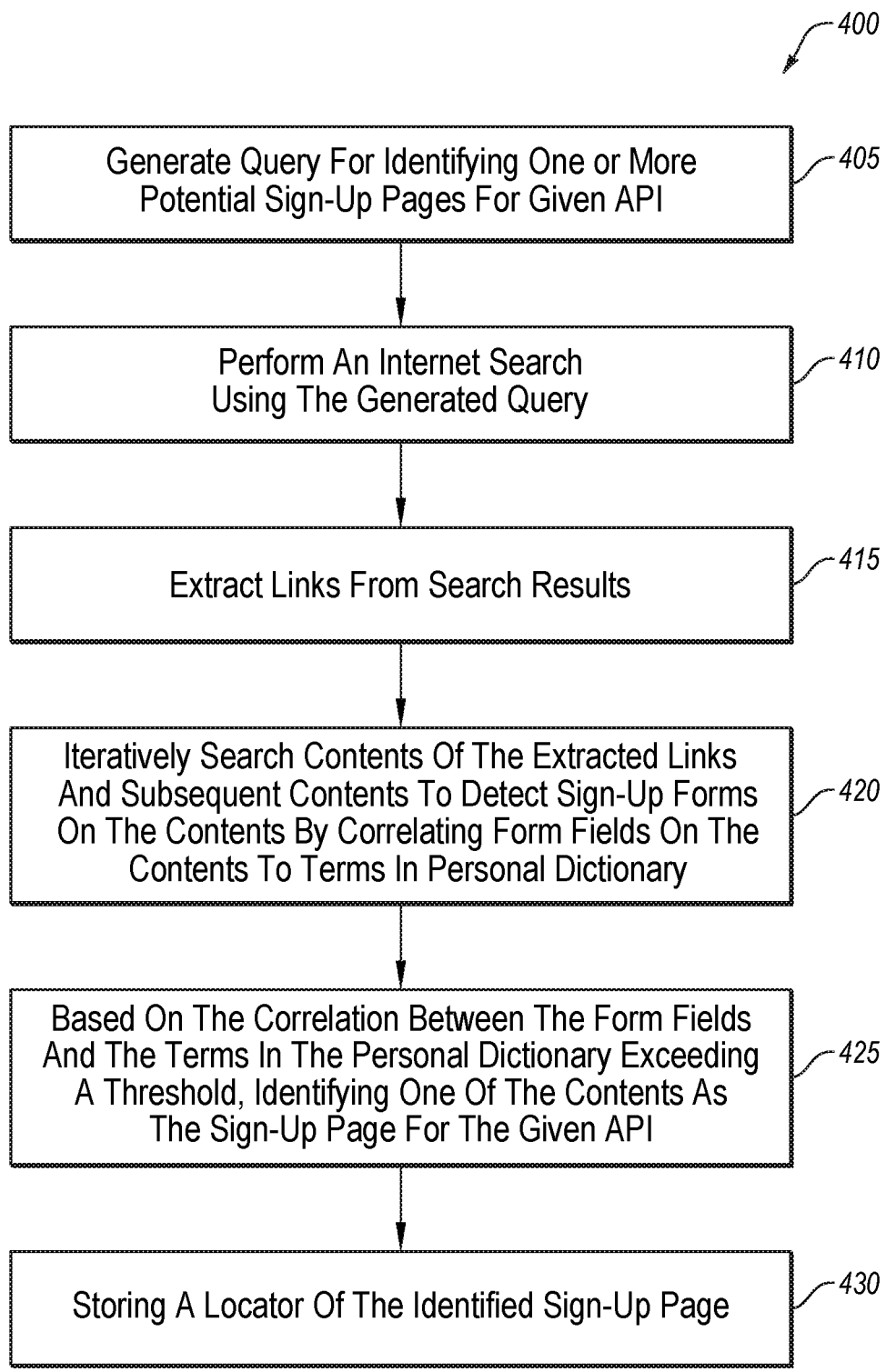
FIG. 4 illustrates an example flowchart of an example method of a search engine-based approach to identifying a sign-up page.

FIG. 4 illustrates an example flowchart of an example method 400 of a search engine-based approach to identifying a sign-up page, in accordance with one or more embodiments of the present disclosure. For example, FIG. 4 may illustrate one implementation of the block 310 of FIG. 3.

At block 405, a query may be generated for identifying one or more potential sign-up pages for the given API. For example, the API platform may utilize a combination of a title of the given API and the provider, developer, and/or host of the given API as search terms. Additionally or alternatively, other key words may be added to the query, such as "sign up," "account," "registration," etc.

At block 410, an Internet search may be performed using the query generated at the block 405. For example, the API platform may submit the query. In some embodiments, web automation technology such as Selenium may be used to submit the Internet query.

At block 415, one or more links may be extracted from the search results of the search performed at the block 410. For example, the API platform may utilize a web automation tool to extract links from the search results. In some embodiments, any "a" tags in the HTML code of the search results may be extracted. Additionally or alternatively, the "a" tags in the HTML code of subsequent pages (e.g., the page arrived at when following a link) through multiple layers may be extracted.

At block 420, the contents of the extracted links (and/or the subsequent contents of the extracted links) may be iteratively searched to detect sign-up forms on the contents by correlating form fields on the contents to terms in a dictionary. For example, the API platform may utilize a BFS search and begin with the first link from the query results. The API platform may open the first link and search for fillable forms on the page and compare the fillable fields to the fields and/or information in the dictionary to generate a similarity score for the page. In these and other embodiments, the analysis of the page of the first link (e.g., the similarity score) may be compared to a threshold. If below the threshold, the API platform may go to the next link and analyze the next page, etc. If a first set of pages from the search query (e.g., the first 10 results, the first 20 results, etc.) do not identify the sign-up page, the API platform may analyze the next layer of pages. For example, the API platform may begin at the page of the first link and extract hyperlinks from that page (e.g., the "a" tags) and may analyze the pages of those links. If those pages are not identified as the sign-up page, the API platform may analyze the pages of the hyperlinks on the second result, etc. If none of the next layer of pages is identified as the sign-up page, the API platform may go to the next layer, etc.

In some embodiments, the API platform may construct the dictionary. For example, the API platform may identify a set number of sample sign-up pages (e.g., five known sign-up pages) and may select a set number of attributes to extract (such as ID, Name, Type, and Placeholder) from each of the pages. The values of the attributes for the pages may be stored in a separate file for each category. Duplicates across the pages may be removed. The tables below illustrate examples of values across four attributes:

| ID |
| --- |
| Name |
| Email |
| Password |
| Organization |
| Username |
| Register_DOB_day |
| Register_DOB_year |
| First_name_input |
| ... |

| NAME |
| --- |
| Email |
| Password |
| Signin |
| Address |
| DOB_day |
| DOB_year |
| FirstNameField |
| PhoneNumber |
| ... |

| TYPE |
| --- |
| Text |
| Submit |
| File |
| Checkbox |
| Password |
| Email |
| Number |
| Radio |
| ... |

| PLACEHOLDER |
| --- |
| Username |
| Email Address |
| First Name |
| Last Name |
| Confirm Password |
| Full Name |
| What should we call you |
| Verification Code |
| ... |

In some embodiments, the API platform may utilize a natural language tool kit (e.g., NLTK) to tokenize and clean the entries in the dictionary. For example, all symbols may be replaced with spaces (e.g., "Register_DOB_day" may be converted to "Register DOB day"). As another example, the terms may be tokenized (e.g., using a pre-trained Punkt model) such as by tokenizing "Full Name" as a single phrase. As a further example, single characters and/or numbers may be removed.

In some embodiments, the API platform may separate multi-word concatenations into the separate words. For example, a words-by-frequency model may be used to separate out phrases such as "Useraccount" into "User account." In some embodiments, the words-by frequency model may utilize a cost dictionary (e.g., using Zipf's law and where cost=−log(probability) of the concatenation being separate words) that may be adapted based on new data from additional sign-up pages.

When comparing a given page to the dictionary, the API platform may identify attributes on the page and may calculate a similarity score comparing all the terms in the dictionary with the extracted attributes. For each attribute, the highest similarity score may be selected and an average similarity score may be calculated across all of the extracted attributes. For example, if the extracted attributes were "Password" (yielding a similarity score of 9.99), "User" (yielding a similarity score of 7.66), and "login" (yielding a similarity score of 6.33), an overall similarity score for the page may be 7.99. That score may be used in the comparison with the threshold to detect whether or not the given page is the sign-up page.

At block 425, based on the correlation between the form fields and the terms in the dictionary exceeding a threshold, one of the contents may be identified as the sign-up page for the given API. For example, if the overall similarity score representative of the correlation (7.99 in the example above) exceeds a threshold (e.g., 7.75), the given page may be identified by the API platform as the sign-up page for the given API.

At block 430, a locator of the identified sign-up page may be stored. For example, the API platform may store the URL of the sign-up page in a record for the given API such that when a user requests access to the given API, the API platform is aware of the address of the sign-up page.

In some embodiments, the process of identifying the sign-up page (e.g., the block 310 of FIG. 3, the method 400 of FIG. 4, and/or the method of FIG. 5) may be performed once for the given API and the API platform may then have stored the sign-up page for the given API, regardless of how many users request access to the given API. Additionally or alternatively, the sing-up page may be identified each time a user requests access, or may be periodically updated (e.g., once a month, etc.) to confirm that the location of the sign-up page (e.g., the URL for the sign-up page) is still the same.

Figure 5:
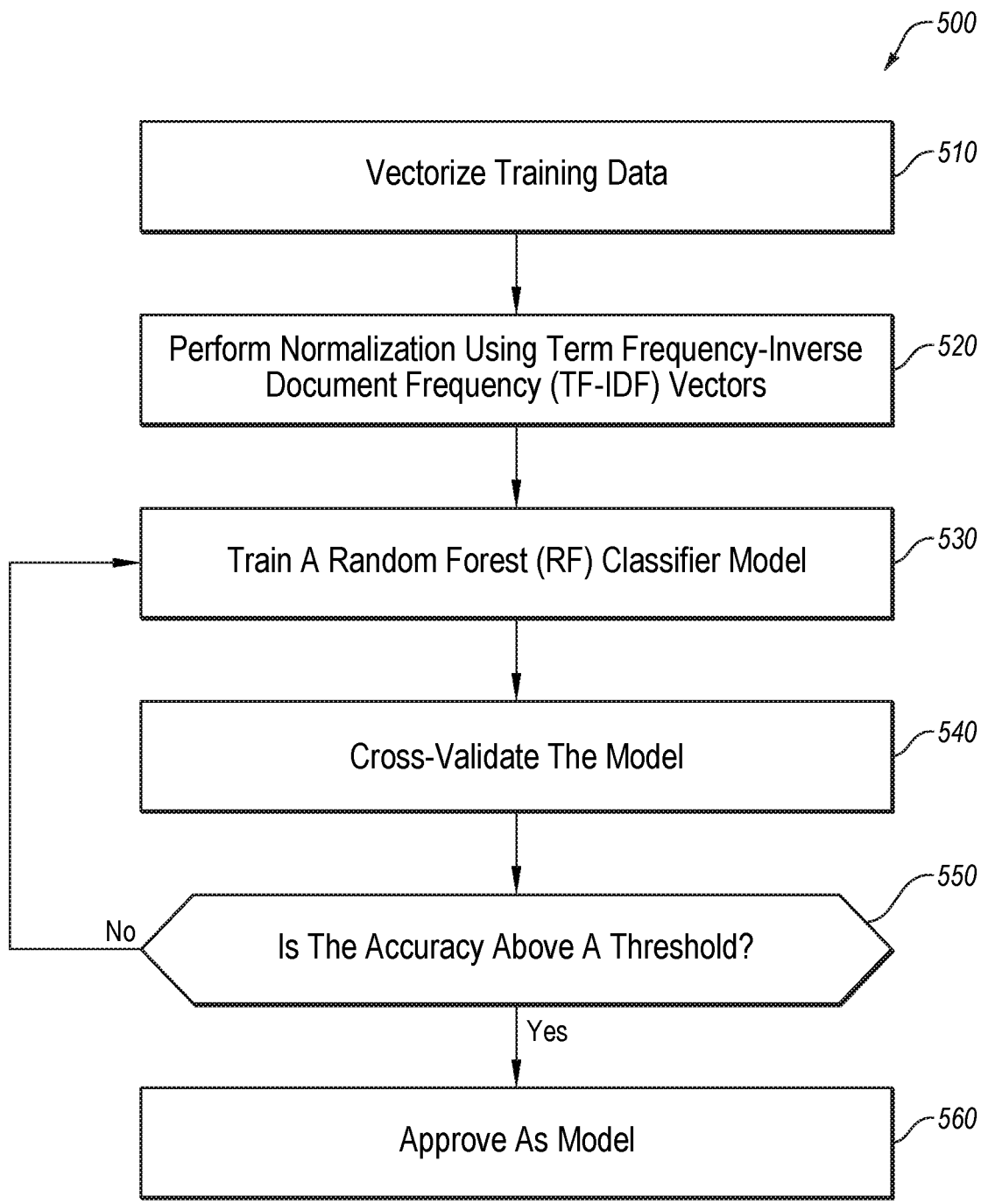
FIG. 5 illustrates an example flowchart of an example method of generating and/or training a model.

FIG. 5 illustrates an example flowchart of an example method 500 of generating and/or training a model, in accordance with one or more embodiments of the present disclosure. The method 500 may be representative of a process that is repeatedly used throughout the present disclosure for generating a pre-trained model or classifier. For example, the block 610 of FIG. 6, block 710 of FIG. 7, block 810 of FIG. 8, block 915 of FIG. 9, block 1010 of FIG. 10, etc. may utilize a similar or comparable process to that illustrated in the method 500 of FIG. 5 in generating a trained model or classifier.

At block 510, training data may be vectorized. The training data may be any obtained data, depending on the model or classifier being trained. For example, the training data may be known sign-up pages, known sign-in pages, known fillable forms, etc. and/or data or metadata extracted therefrom. For example, for a given sign-up page, all the attributes and label texts for the page may be extracted. In some embodiments, certain attributes (e.g., onclick, style, data-bind) may be excluded.

At block 520, normalization may be performed using a term frequency-inverse document frequency (TF-IDF) on each of the vectors to quantify how important the vector is to the page. While TF-IDF is described, it will be appreciated that this is simply one example of generating and/or applying training data for a machine learning model which consistent with the present disclosure, and any such approaches may be utilized in any of the embodiments of the present disclosure. For example, instead of TF-IDF, a pre-trained model may be applied to facilitate a determination of the embedding of the training data within various pages associated with a given API.

At block 530, a random forest (RF) classifier model may be trained. For example, the API platform may provide the RF model with aspects of the training data vectorized at the block 510 and the result (e.g., a vector of these terms corresponds to a particular trait). While an RF classifier is described, it will be appreciated that this is simply one example of a machine learning model which may be utilized in accordance with the present disclosure, and any machine learning models may be used in any of the embodiments of the present disclosure. For example, other machine learning models such as neural networks, deep learning models, etc. can be used instead of the random forest model.

At block 540, the model trained at the block 530 may be cross-validated. For example, the API platform may provide the RF model with another set of data known to meet the criteria and may observe the performance of the RF model. In some embodiments, the evaluation may utilize a five-fold stratified cross-validation technique, and the precision, recall, F1 score, accuracy, etc. may be validated for the trained model.

At block 550, a determination may be made whether the accuracy of the model is above a threshold. If the accuracy is above the threshold for the model, the method 500 may proceed to the block 560. If the accuracy is below the threshold, the method 500 may return to the block 530 to further train the model. For example, additional training data may be provided to the model. Additionally or alternatively, other parameters or settings of the RF model may be modified.

FIG. 6 illustrates an example flowchart of an example method 600 of a machine learning-based approach to identifying a sign-up page, in accordance with one or more embodiments of the present disclosure. For example, FIG. 6 illustrates one example implementation of block 310 of FIG. 3. FIG. 6 includes a training portion (blocks 605 and 610) and a live usage portion (blocks 650-670).

At block 605 (in the training portion), data may be extracted from collected sign-up pages. For example, the API platform may utilize a search engine-based approach to identify multiple API sign-up pages and may collect those API pages to be used as training data. Additionally or alternatively, a user may manually select, identify, or otherwise provide known sign-up pages to the API platform.

At block 610, a trained model of sign-up pages may be generated to be used by a machine learning process. For example, the API platform may utilize a process such as that illustrated in FIG. 5, using the data from the block 605 as the training data.

At block 650 (in the live usage portion), an API documentation page may be obtained for a new API. For example, the API documentation page may be identified by the API platform (such as in block 205 of FIG. 2).

At block 655, links may be extracted from the API documentation page. For example, the API platform may extract all "a" tags, may search for structures of hyperlinks (e.g., http://*.*), etc.

At block 660, the extracted pages are iteratively analyzed to detect whether or not a given extracted page is the sign-up page for a given API by extracting data from the given extracted page and comparing the extracted data to the pretrained model. For example, for the given extracted page, the API platform may extract all attribute values and label texts in a similar or comparable manner to block 605. Continuing the example, the extracted data may be vectorized and/or normalized in a similar or comparable manner to that in block 510 and 520 of FIG. 5, and the data may be provided to the trained model generated at the block 610.

At block 665, based on the comparison with the pretrained model, the given page may be identified as the sign-up page for the given API. For example, applying the trained model to the extracted data by the API platform may indicate that the given page is the sign-up page for the given API. If the given page is not identified as the sign-up page, the API platform may continue to iteratively analyze the extracted pages and/or subsequent pages (such as the links on the linked to pages).

At block 670, a locator of the identified sign-up page may be stored. For example, the API platform may store the sign-up page in a repository associated with the given API. Additionally or alternatively, the identified sign-up page may be provided to the training of the model to further tune and/or train the model.

FIG. 7 illustrates an example flowchart of an example method 700 of automatically filling in sign-up forms of a sign-up page, in accordance with one or more embodiments of the present disclosure. FIG. 7 includes a training portion (blocks 705 and 710) and a live usage portion (blocks 750-790).

At block 705 (training portion), extracted data may be categorized into representative input fields. For example, the data extracted at the block 605 for each of the known sign-up pages used for identifying a sign-up page may be extracted, such as all of the input tag attribute values and/or the label texts.

At block 710, the extracted data of the block 710 may be used to create a representative classifier for each of the fields. For example, a set of representative input fields may be identified, and may each have their own classifier generated. Such representative fields may include ID, email, username, password, etc. The representative fields may be automatically generated by the API platform by analyzing the known sign-up pages, or from user selection or identification of such fields.

At block 750 (usage portion), a sign-up page may be obtained. For example, the API platform may identify the URL for the sign-up page from the repository, and may navigate to the sign-up page.

At block 755, data may be extracted from the sign-up page to identify each of the fillable fields on the sign-up page. For example, the API platform may extract all the input tag attribute values.

At block 760, for a given fillable field, a determination may be made whether there is a match for the field in the classified fields. For example, the API platform may utilize the trained model for the different classes to determine whether there is a match in the representative fields from the block 710 (e.g., a field "password" is on the given page being analyzed, and there is a representative field "password" whose trained model identifies the "password" as being a match). If there is a match, the method 700 may proceed to the block 770. If there is not a match (e.g., the classifier fails (e.g., none of the trained models return a positive result) or there is a conflict between multiple representative fields (e.g., multiple trained models return positive results)), the method 700 may proceed to the block 765.

At block 765, a closest match may be identified. For example, a similarity score with a dictionary may be utilized, such as the dictionary and similarity score as described with reference to FIG. 4, to identify the closest representative field.

At block 770, sample values may be input into the fields to provide temporary access to the given API to receive sign-up credentials. For example, the sample values may be generic terms or sample terms associated with the API platform such that temporary access may be provided to a user of the API platform.

At block 775, a determination may be made whether the system is limited in its ability to proceed. For example, if there is a captcha field or other component that prevents the API platform from continuing to enter information into the fillable forms or to submit the filled in forms, there may be a limitation in permitting the system to proceed. In some embodiments, the limitation may be an error or failure caused by a mismatch between the identified field, such as the closest match and/or improper data being entered. If there is a limitation, the method 700 may proceed to the block 780. If there is no limitation, the method 700 may proceed to the block 785. In some embodiments, the operation of the block 775 may be an on-going operation throughout the method 700 and/or other methods. For example, if a captcha field occurs during signing up, signing in, registering a project, etc., the API platform may prompt the user for input before proceeding.

At block 780, the user may be prompted for input. For example, the user may be prompted to comply with the captcha request or to correct the error triggering the limitation on the ability of the API platform to proceed with signing up for the API.

At block 785, user input may be received to change the sample values to established values when the user is adopting the given API. For example, the user may be able to submit their personal information and/or the information regarding their project after sampling an API and deciding they want to use the given API in their software project. In some embodiments, the block 785 may represent any user feedback, such as user feedback correcting an error or inputting correct information for a fillable form field.

At block 790, the trained model of the block 710 may be updated and/or retrained or otherwise incorporate changes that occurred during filling the forms. For example, if the user corrected an error in classifying a fillable form field, or if certain sample data triggered an error, the model may account for the correction such that for a future API sign-up for a different API (or the same given API), the automatically signing up with the API may occur in a more streamlined and/or uninterrupted manner by using the feedback of the user input. In some embodiments, the corrected sample value input by the user may be saved as the sample value to use for other corresponding fillable fields.

Figure 8:
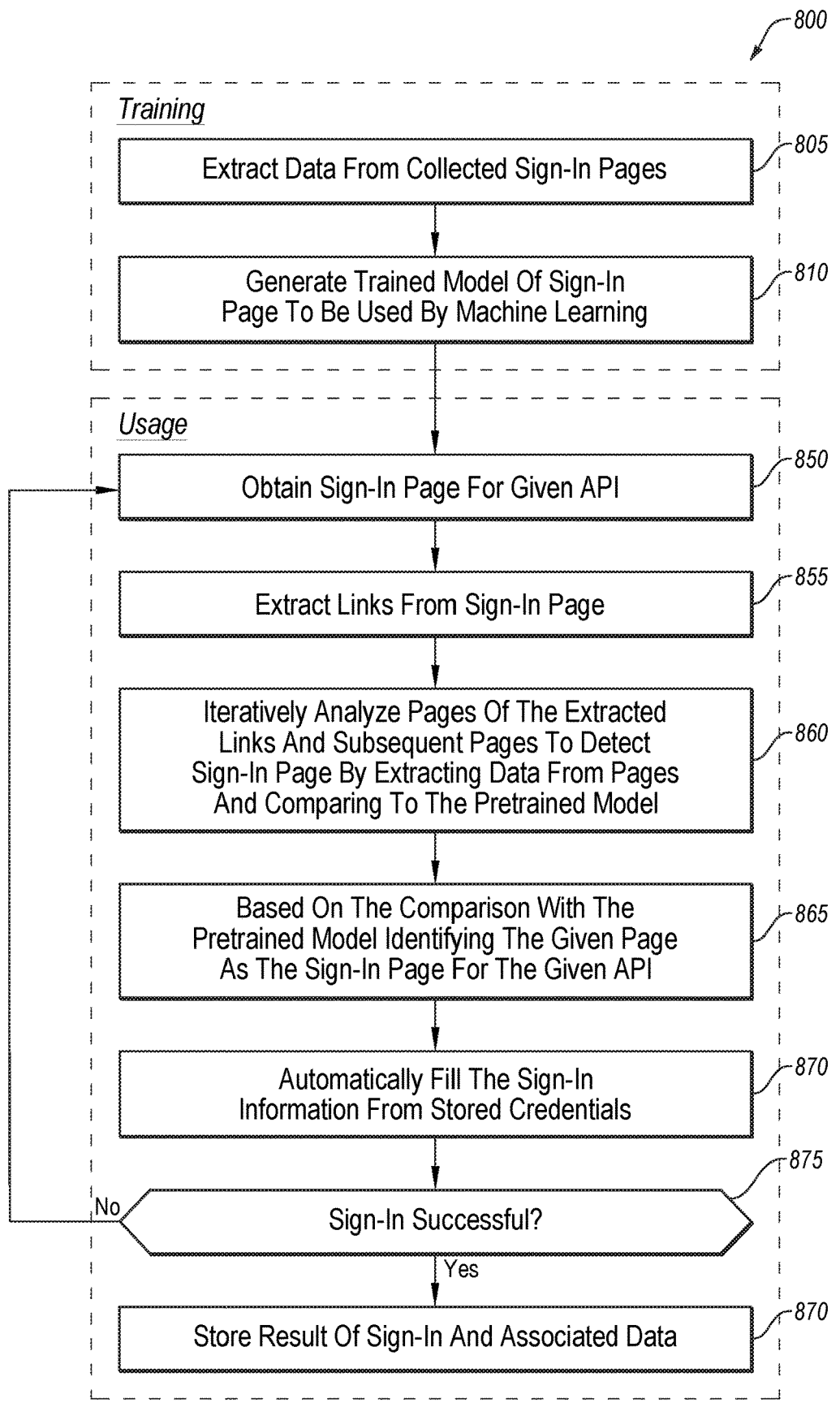
FIG. 8 illustrates an example flowchart of an example method of a machine learning-based approach to identifying a sign-in page.

FIG. 8 illustrates an example flowchart of an example method 800 of a machine learning-based approach to identifying and signing in to a sign-in page, in accordance with one or more embodiments of the present disclosure. In some embodiments, the method 800 may be followed to verify the success of the sign-up performed, such as the sign-up performed by following the method 700 of FIG. 7. FIG. 8 includes a training portion (blocks 805 and 810) and a live usage portion (blocks 850-880).

At block 805, data may be extracted from collected sign-in pages for various APIs. For example, the API platform may extract attribute values and/or labels.

At block 810, a trained model of a sign-in page may be generated to be used by the machine learning process. For example, the block 810 may follow the process illustrated in FIG. 5 to vectorize, train, and validate the model of the sign-in page.

At block 850, a sign-in page for a given API may be obtained. For example, the sign-in page may be previously identified (such as using the method illustrated in FIG. 4 or 6).

At block 855, links may be extracted from the sign-in page. The block 855 may be similar or comparable to the block 655.

At block 860, the extracted pages may be iteratively analyzed to detect whether or not a given extracted page is the sign-in page for a given API for which the API platform has signed up, by extracting data from the given extracted page and comparing the extracted data to the pretrained model. For example, for the given extracted page, the API platform may extract all attribute values and label texts in a similar or comparable manner to block 605. Continuing the example, the extracted data may be vectorized and/or normalized in a similar or comparable manner to that in block 510 and 520 of FIG. 5, and the data may be provided to the trained model generated at the block 810.

At block 865, based on the comparison with the pretrained model, the given page may be identified as the sign-in page for the given API. For example, applying the trained model to the extracted data by the API platform may indicate that the given page is the sign-in page for the given API. If the given page is not identified as the sign-in page, the API platform may continue to iteratively analyze the extracted pages and/or subsequent pages (such as the links on the linked to pages).

At block 870, the sign-in fields may be automatically filled in with the credentials used when signing up for the given API. For example, the corresponding fields such as username, email, password, etc. used for the sign-up process illustrated in FIG. 7 may be automatically filled in the input labeled fields of the sign-in page with the same label. In some embodiments, the credential filling in routine may follow a similar or comparable routine to that used to automatically sign up for the given API (e.g., the method 700 of FIG. 7), such as extracting fields, identifying the closest match, providing the sample values, etc.

At block 875, a determination may be made whether the sign-in was successful. If the sign-in was successful, the method 800 may proceed to the block 880. If the sign-in was not successful, the method 800 may return to the block 850. For example, the API platform may seek to identify an alternative sign-in page if an incorrect sign-in page was previously identified. In some embodiments, the API platform may prompt the user for input upon a failed sign-in. For example, the user may be asked to identify the proper sample value corresponding to the fillable field(s) causing the failed sign-in.

At block 880, a result of the sign-in and associated data may be stored. For example, the API platform may store a URL of the sign-in page, the sign-in credentials, their corresponding fields, etc. used during the successful sign in.

FIG. 9 illustrates an example flowchart of an example method 900 of registering an application or project, in accordance with one or more embodiments of the present disclosure. For example, if a given API utilizes OAuth (e.g., OAuth 2.0) as the authentication approach, the API host may prevent access to the API prior to registering a project with the API host. FIG. 9 includes a training portion (blocks 905-920) and a live usage portion (blocks 950-975).

At block 905 (the training portion), application registration pages may be obtained. For example, for known application registration processes, the API platform may obtain multiple representative examples of various states throughout the application registration process. In some embodiments, each of the pages may be preprocessed to be better understood and/or incorporated into the model. For example, for a given page, the raw text description may be split into words, keywords, etc. through a tokenization process. As another example, the tokenized text may undergo a lemmatization process by which different inflections of the same word may be combined so they can be analyzed as a single item (e.g., converting "am," "are, "is" to "be," or converting "car," "cars," "car's," "cars'," as car, etc.). As a further example, stop words may be ignored (such as "the," "is," "at," "which," "a," "an," etc.). As another example, concatenated tokens may be split into separate words using a similar approach to that described with reference to block 520 (e.g., the term "UserID" may be split to "User" and "ID").

At block 910, user-annotated data regarding the representative states may be obtained. For example, the API platform may prompt a user to provide user annotations to the sets of known pages for the application registration process identifying the various representative states. As another example, a user may annotate the different pages elsewhere and may provide the annotated versions directly to the API platform.

At block 915, a classifier/model may be trained for each of the representative states based on the annotated data. The block 915 may follow a similar approach to that described with reference to FIG. 5. In some embodiments, the block 915 may utilize a different vectorizer as the vocabulary may be larger than for the other models being trained. In these and other embodiments, a hashing vectorizer may be used to provide a hash of term frequency values in order to reduce the vector length and decrease processing costs in conjunction with training the model and/or applying the model.

At block 920, a set of predefined actions associated with each of the predefined states may be identified. For example, the user annotated data may indicate which actions may be taken from a given state. As another example, the API platform may determine which steps are most often taken between states by determining the transitions between states and the actions taken to cause the transitions for the known application registration pages.

At block 950 (the live usage portion), a document page for the API may be obtained for a given API. For example, the document page may include a landing page after a successful sign-in with the API host. As another example, the document page may include a home page for the given API. As a further example, the document page may be any page from which the application registration process may begin.

At block 955, a current state may be determined. For example, the block 955 may follow a similar process to other processes described herein in which the API platform may extract the textual data of the present page and may compare it to each of the models for each of the representative states. Based on the model having a match (e.g., only one model returns a positive result), the current state may correspond to the representative state associated with the model that matches. If multiple models return a positive result or no models return a positive result, a closest match may be obtained as the current state.

At block 960, a determination may be made whether the registration process is complete. If the registration process is not complete, the method 900 may proceed to the block 965. If the registration process is complete, the method 900 may proceed to the block 970.

At block 965, the API platform may take an action available when in the current state to transition from the current state to a next state, after which the method 900 may return to the block 955 to identify the current state. In some embodiments, the state transition may be represented by a Markov model in which the probabilities the system is to transition from the present state into a particular potential next state are represented. For example, a matrix of probabilities may be prepared representative of each of the states (e.g., with N states, an N×N matrix of the probabilities of transitioning from one state to another state). In these and other embodiments, when selecting which action to take/ which transition to follow, the API platform may make a random selection of a next state informed by the probabilities (e.g., by using a numpy.random.choice algorithm).

In some embodiments, the state transition may include a check to verify that the state transitioned to is the correct state. For example, the new state after the action may be checked to see if the new state is the expected state. If the expected state is not the new state, the API platform may revert to the previous state and select a different action.

With respect to potential states, actions to transition therebetween, etc., FIGS. 12A-12E include example illustrations of representative states, transitions therebetween, and potential probabilities associated therewith. These examples are in no way limiting and merely serve as an illustration to convey the principles of the present disclosure.

At block 970, client OAuth credentials may be extracted. For example, after the application and/or project has completed the registration process, a client identifier, a client secret, etc. may be extracted as the OAuth credential. Additionally or alternatively, an OAuth authorization code and/or access token may be extracted as the OAuth credential.

At block 975, the extracted OAuth credentials may be stored. For example, the API platform may store the OAuth credentials as associated with the given API. In these and other embodiments, the OAuth credentials may be stored such that they can be used to access the given API, confirm approval of a user to access the given API, etc.

FIG. 10 illustrates an example flowchart of an example method 1000 of extracting an API key, in accordance with one or more embodiments of the present disclosure. For example, for projects in which a given API utilizes an API key for authorization, the API platform may extract the API key according to the method 1000 after signing up. FIG. 10 includes a training portion (blocks 1005 and 1010) and a live usage portion (blocks 1050-1070).

At block 1005, data may be extracted from collected API-key pages for various APIs. For example, the API platform may extract attribute values and/or labels.

At block 1010, a trained model of an API-key page may be generated to be used by the machine learning process. For example, the block 1010 may follow the process illustrated in FIG. 5 to vectorize, train, and validate the model of the API-key page.

At block 1050, an API document page for a given API may be obtained. For example, the document page may include a landing page after a successful sign-in with the API host. As another example, the document page may include a home page for the given API.

At block 1055, links may be extracted from the API document page. The block 1055 may be similar or comparable to the block 655.

At block 1060, the extracted pages may be iteratively analyzed to detect whether or not a given extracted page is the API-key page for a given API for which the API platform has signed up. The block 1060 may be performed in part by extracting data from the given extracted page and comparing the extracted data to the pretrained model. For example, for the given extracted page, the API platform may extract all attribute values and label texts in a similar or comparable manner to block 605. Continuing the example, the extracted data may be vectorized and/or normalized in a similar or comparable manner to that in block 510 and/or 520 of FIG. 5, and the data may be provided to the trained model generated at the block 1010.

At block 1065, based on the comparison with the pre-trained model, the given page may be identified as the API-key page for the given API. For example, applying the trained model to the extracted data by the API platform may indicate that the given page is the API-key page for the given API. If the given page is not identified as the API-key page, the API platform may continue to iteratively analyze the extracted pages and/or subsequent pages (such as the links on the linked to pages). Additionally or alternatively, the API platform may identify and/or extract the API-key on the API-key page. For example, the API-key may be a data field or textual field on the API-key page and the text within that field may be extracted.

At block 1070, the API-key may be stored. For example, the API platform may store the API-key in conjunction with the API as a credential to be used when seeking access of the given API.

FIG. 11 illustrates an example flowchart of an example method 1100 of resolution and/or renewal of OAuth credentials, in accordance with one or more embodiments of the present disclosure. When a user of the API platform seeks access to a given API, the API platform may determine whether the given API utilizes OAuth or an API key for granting access. If it is an API key, the API platform may retrieve a stored key (such as a key stored according to the method 1000 of FIG. 10). If it is an OAuth security process, the API platform may resolve and/or renew the OAuth credentials such that the user is able to access the API.

At block 1105, stored OAuth information may be retrieved. For example, information regarding the location for requesting OAuth credentials. As another example, the information may include the credentials, associated software application/project, etc. to be used to submit a request for or begin the process of requesting access to the API.

At block 1110, the information may be uploaded as a POST request. For example, the API platform may submit the information to begin the process of requesting access to the given API.

At block 1115, an OAuth object may be initialized. For example, a secondary server associated with the API platform (including a sub-system of the API platform) may initialize the OAuth object to request access to the API.

At block 1120, a browser at the API platform may open an OAuth resolver that may trigger the request for access to the API. In some embodiments, the OAuth resolver may be represented as being associated with the registered application/project.

At block 1125, based on the opening of the OAuth resolver, the secondary server may request an authorization code from the API host. In response the API host may query the registrant of the application/project if permission to access the API via the application is granted.

At block 1130, the API platform may receive the request for permission to access the API via the application.

At block 1135, the API platform may submit the login credentials. For example, the login credentials may include the client identifier, the client secret, etc.

At block 1140, the API host may return the access code to the secondary server based on approval of the login credentials submitted at the block 1135.

At block 1145, the secondary server may request an access token. For example, the secondary server may request the access token using the access code. As another example, the secondary server may submit an API call using the access code.

At block 1150, the secondary server may retrieve the access token from the API host. For example, the API host may post the access token based on the request at the block 1145. Additionally or alternatively, the API host may communicate the access token directly to the secondary server.

At block 1155, the API platform may create HTML based on the response from the secondary server. For example, the API platform may create HTML that is received as part of the registered application/project and presents the API responsive data.

At block 1160, the API platform may extract the access token from the created page. For example, the data received from the secondary server may include the access token for OAuth.

At block 1165, the access token may be stored by the API platform. For example, the API platform may store the OAuth access token in conjunction with the given API such that if a user desires to access and/or observe the use of the given API, the credentials are available via the OAuth access token to do so. In some embodiments, the OAuth access token may be stored with an expiration date/time or a period after which the OAuth access token is to be renewed if access is sought.

In some embodiments, the method 1100 may be followed when a user attempts to sample the API by using the sample use as part of the request for access.

Modifications, additions, or omissions may be made to any of the methods 200-1100 without departing from the scope of the disclosure. For example, the operations of any of the methods 200-1100 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 12A:
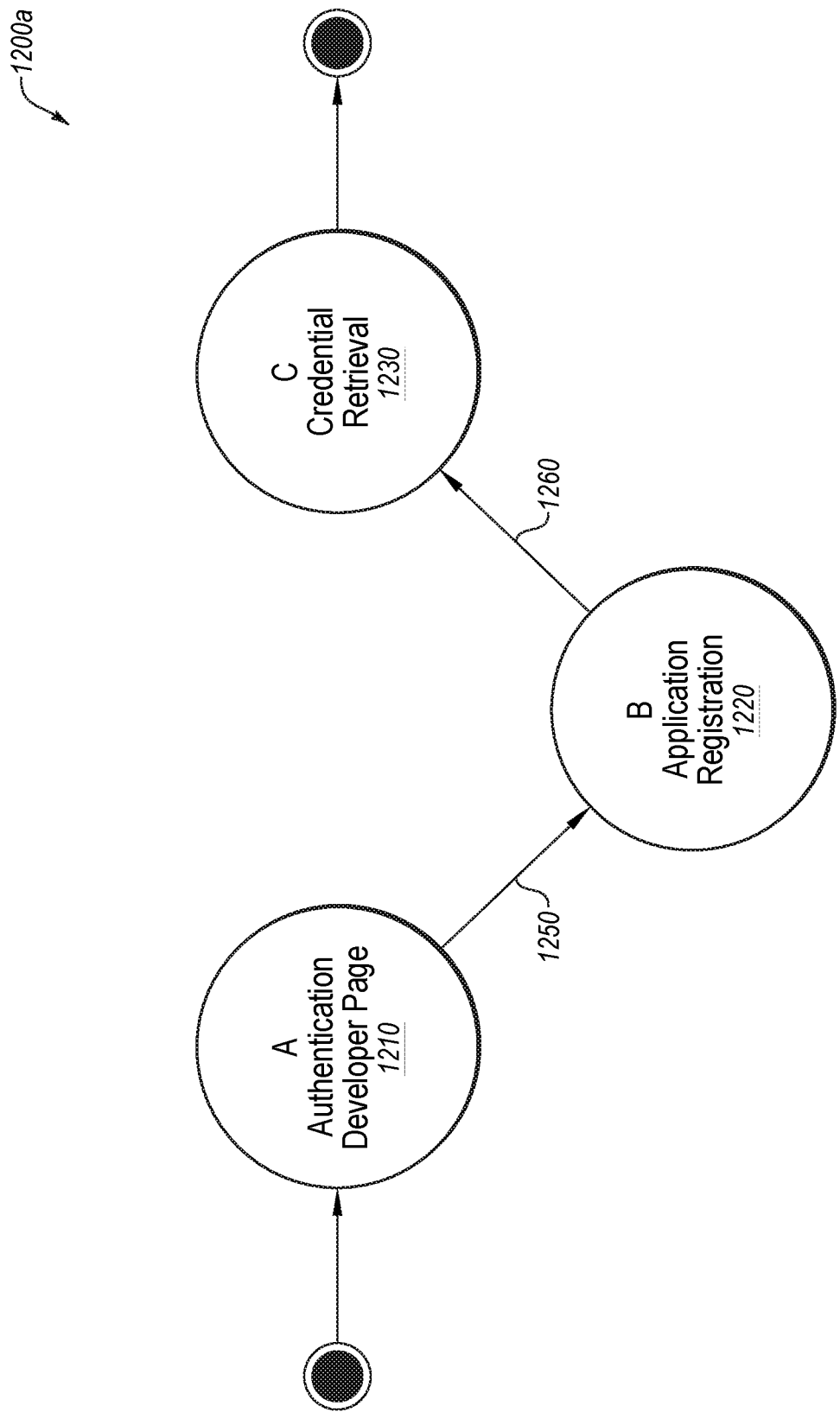
FIG. 12A illustrates a first set of example states in registering an application.

FIGS. 12A-12E illustrate various states and/or transitions between states for state diagrams. FIG. 12A illustrates an overall process with three general states, and FIGS. 12B-12E illustrate various transitions between states when traversing the three states of FIG. 12A. An action is taken to transition between each of the states. In some circumstances, FIGS. 12A-12E illustrate example probabilities that the respective action is taken to transition from one state to another.

FIG. 12A illustrates a first set of example states 1200a in registering an application, in accordance with one or more embodiments of the present disclosure.

The state 1210 may represent generally arriving at a page associated with the given API, such as an API host home page, a landing page after signing in, a documentation page for the given API, etc. Additionally or alternatively, the state 1210 may represent the state associated with logging in to the API host sites and/or getting to the application registration process.

The action 1250 may represent action taken to go from the authentication developer page to the application registration process.

The state 1220 may represent the application registration process.

The action 1260 may represent action taken to go from the application registration process to the credential retrieval state.

The state 1230 may represent the credential retrieval state. The credential retrieval state 1230 may represent the state in which the credentials associated with the registered application from the state 1220 may be retrieved and stored by the API platform.

Figure 12B:
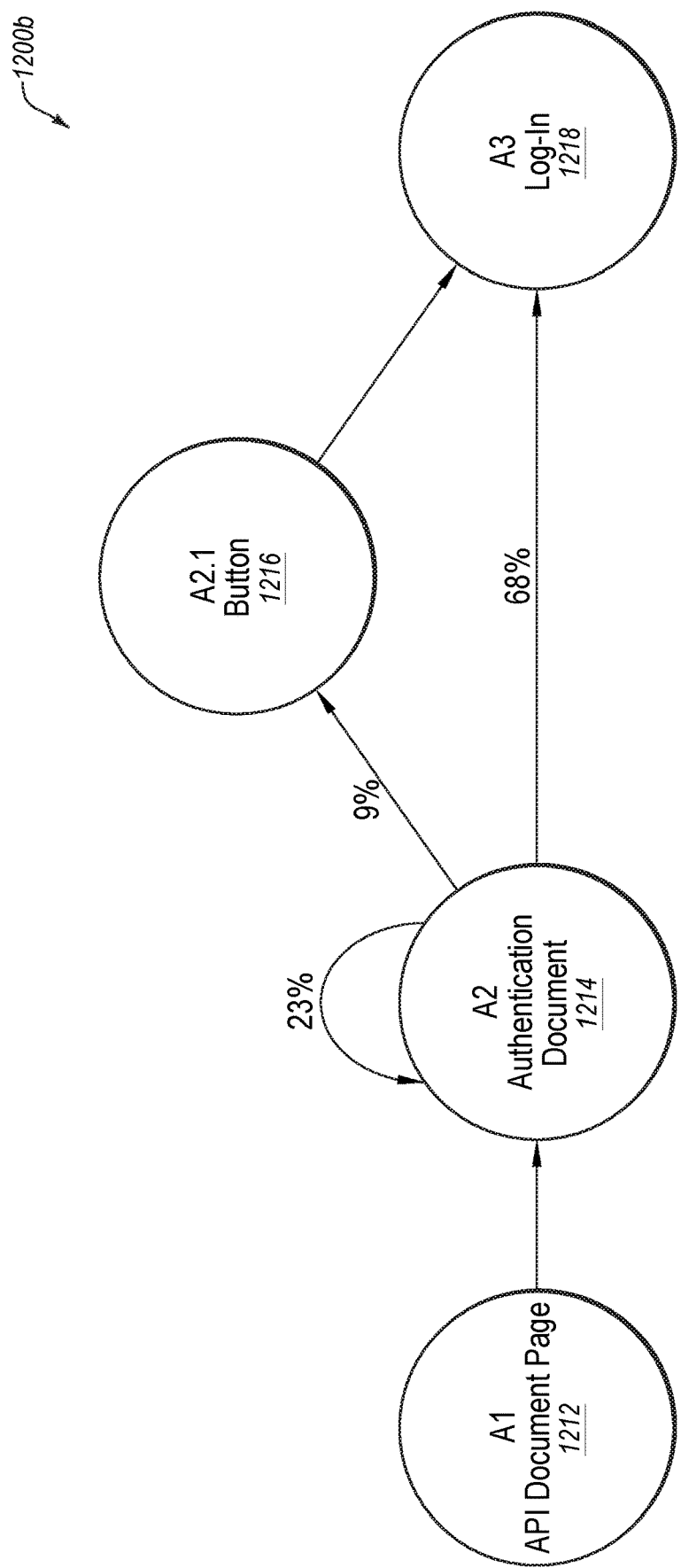
FIG. 12B illustrates a second set of example states in registering an application.

FIG. 12B illustrates a second set of example states 1200b in registering an application, in accordance with one or more embodiments of the present disclosure. The states illustrated in FIG. 12B represent sub-states of the state 1210 of FIG. 12A.

The state 1212 may represent the state of being at the API document page. For example, the API document page may represent the landing page after signing in to the API host system relative to the given API.

The state 1214 may represent the state of being at what is potentially the authentication document, or in other words, the page from which the application registration is accessed.

The action to transition between the state 1212 and the state 1214 (and the action to remain at the state 1214) includes extracting the links within the current page associated with the current state and verifying whether or not the title contains the API name and words similar to "authorize," "authentication," "authorizing," "authenticating," "authorize," "authenticate," etc. In some embodiments, such an action may be similar or comparable to the process of block 660 of FIG. 6 to iteratively analyze each link. In these and other embodiments, each iteration of checking another link may be represented by the arrow staying at the state 1214.

In the example illustrated, the probability that the authentication document (state 1214) that is initially categorized as the authentication document may include the analysis of additional pages (such as a second or third layer worth of links and/or pages) may be 23%. Further following the example, the probability that the authentication document includes a button to begin the application registration process may include a 9% chance, and the probability that a log-in is the initial state before the registration process is a 68% chance.

The action to transition between the state 1214 (the authentication document) and the state 1218 (log-in) includes extracting links with the attribute text/label associated that, after cleaning and tokenization, includes terms such as "create," "application," "register," "oauth," "authenticate," "client id," "client secret," "authorization," etc. For example, a link that is identified that includes such information may result in the transition to the log in state 1218. In some embodiments, such an action may be similar or comparable to the process of block 660 of FIG. 6 to iteratively analyze each link. In these and other embodiments, each iteration of checking another link may be represented by the arrow staying at the state 1214.

The state 1216 may represent a button element. In some embodiments, rather than just a link to arrive at the log in state 1218, the API host site structure may include a button that is clicked to arrive at the application registration process. In these and other embodiments, the transition from the state 1216 to the state 1218 includes clicking the button with the attribute text label that includes terms such as "create," "application," "register," "oauth," "authenticate," "client id," "client secret," "authorization," etc.

The log-in state 1218 may represent the state of entering credentials such that the project or application registration process is able to begin.

In these and other embodiments, the transitions between states may be similar or comparable to the process of identifying and/or detecting a sign-in page, a sign-up page, etc.

Figure 12C:
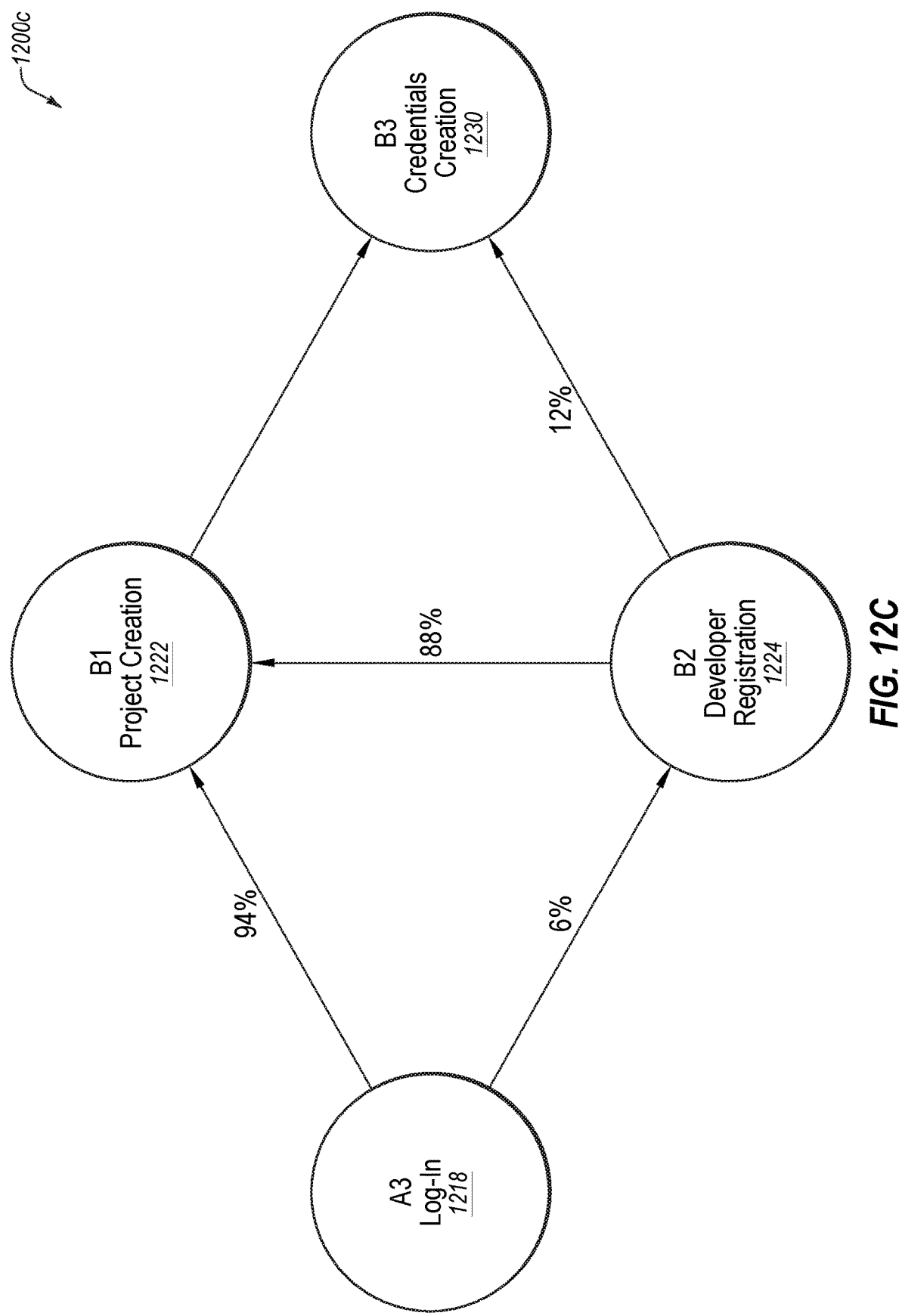
FIG. 12C illustrates a third set of example states in registering an application.
Figure 12D:
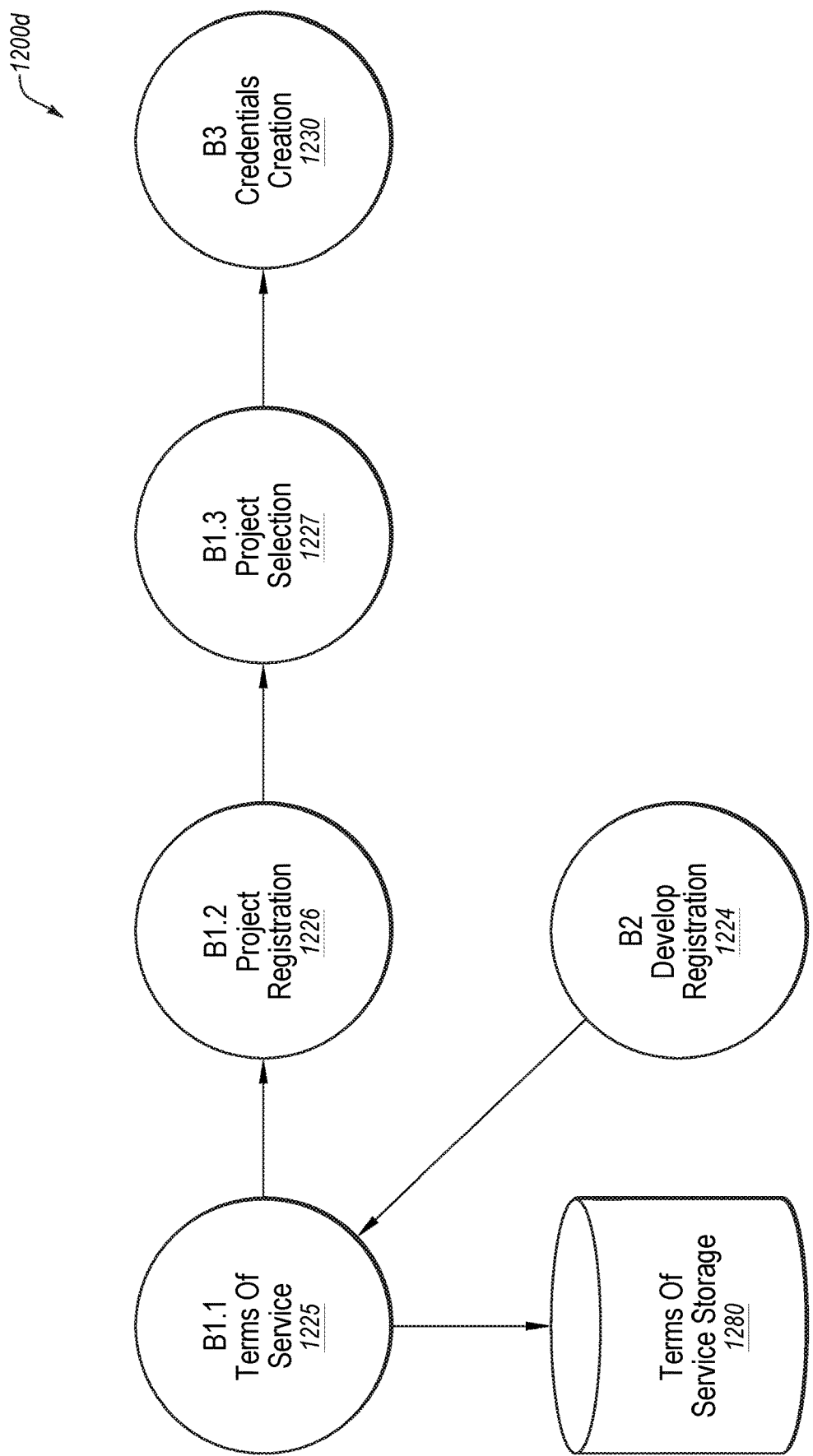
FIG. 12D illustrates a fourth set of example states in registering an application.
Figure 12E:
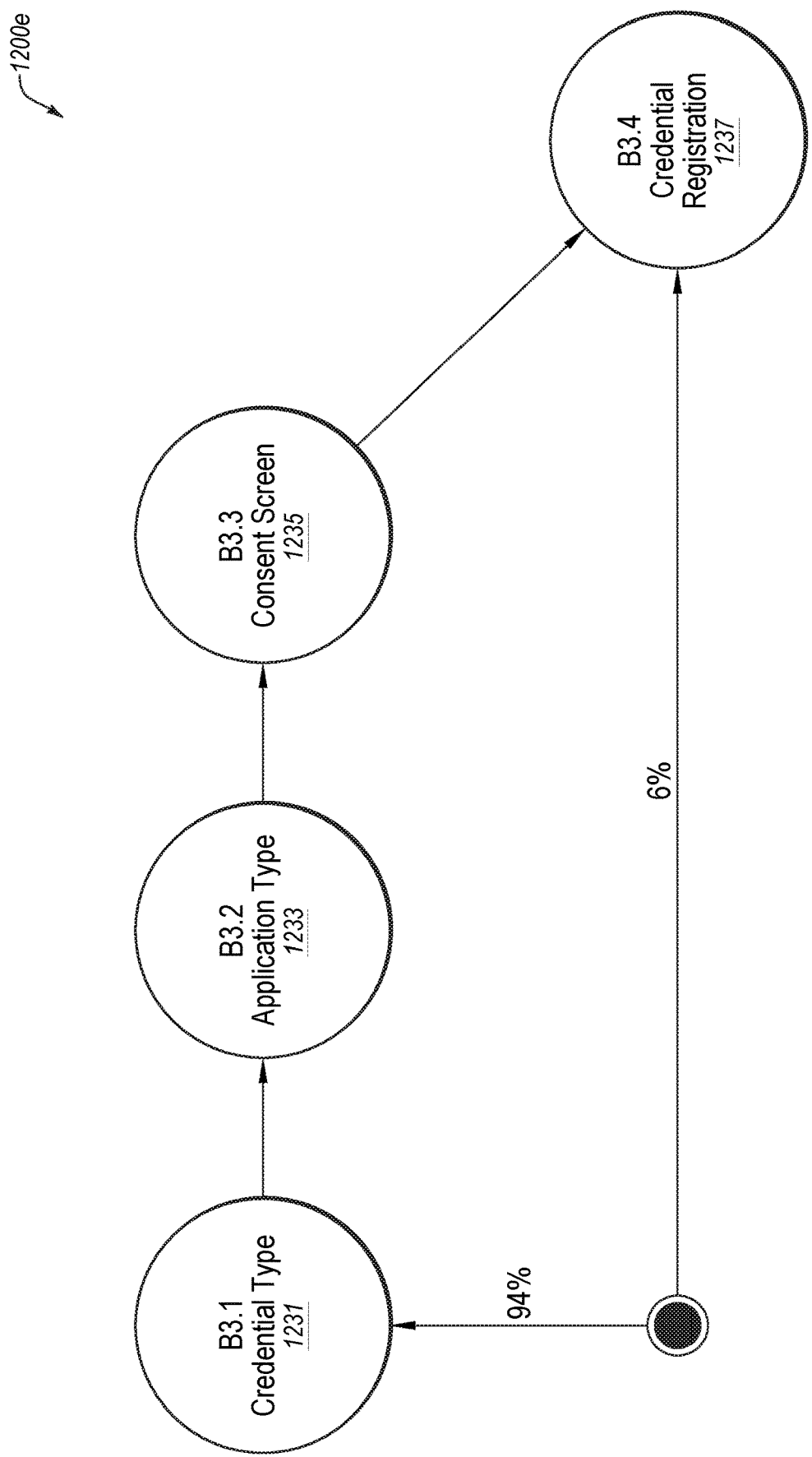
FIG. 12E illustrates a sixth set of example states in registering an application.

FIG. 12C illustrates a third set of example states 1200c in registering an application, in accordance with one or more embodiments of the present disclosure. FIG. 12C illustrates a more detailed view of sub-states of the state 1220 of FIG. 12A. FIG. 12D illustrates a more detailed view of sub-states of the states of the states of FIG. 12C. FIG. 12E illustrates a more detailed view of sub-states of the state 1230 of FIG. 12A.

After logging in (state 1218), the probability of the API host having a developer registration is a 6% chance and a 94% chance that the API host goes directly to project creation (state 1222) in which the application/project may be registered. After project creation (state 1222), the credentials may be created (state 1230). In some embodiments, after developer registration (state 1224) the credentials may be created (state 1230) with a probability of 12%, and otherwise the API host process may include project creation after developer registration.

FIG. 12D illustrates a fourth set of example states 1200d in registering an application, in accordance with one or more embodiments of the present disclosure. For example, when logging in (state 1218) goes directly to project registration, the state may begin at the state 1225. As another example, when logging in (state 1218) goes to developer registration (state 1224), the state may begin at the state 1224 as illustrated in FIG. 12D.

At the state 1224, information regarding the developer of the application/project may be input. In some embodiments, entering such information may proceed in an automated fashion similar to that described with reference to automatically filling the fillable forms to sign up for the API illustrated in FIG. 7.

At the state 1225, terms of service associated with the given API and/or the API host may be available for review. In some embodiments, the API platform may store a copy of the terms of service in a terms of service storage 1280 as associated with the given API. To transition from the state 1225 (viewing the terms of service) to project registration (state 1226), the action may include identifying and clicking a link or button to approve the terms of service. For example, a process to identify an element with properties of class "button," id of "accept" and has a "href" attribute or something similar or comparable may be followed to find the button or link to approve the terms of service.

At the state 1226, the project may be registered by entering information about the application/project. In some embodiments, entering such information may proceed in an automated fashion similar to that described with reference to automatically filling the fillable forms to sign up for the API illustrated in FIG. 7. To transition from the state 1226 (project registration) to state 1227 (project selection), the action may include identifying and clicking a link or button to create the project. For example, a process to identify an element with properties of class "button," id of "create" and an "href" attribute or something similar or comparable may be followed to find the button or link to create the project.

At the state 1227, a created project may be selected. In some embodiments, entering such information may proceed in an automated fashion similar to that described with reference to automatically filling the fillable forms to sign up for the API illustrated in FIG. 7. In some embodiments, such a selection may include selecting the project created in the state 1226. To transition from the state 1227 (project selection) to state 1230 (credential creation), the action may include identifying and clicking a link or button selecting the project registered at the state 1226. For example, a process to identify an element with properties of class "mat-button," id of "credentials" and has a "href" attribute or something similar or comparable may be followed to find the button or link to create credentials for the registered project.

FIG. 12E illustrates a fifth set of example states 1200e in registering an application, in accordance with one or more embodiments of the present disclosure.

When arriving at the state 1230 as illustrated in FIGS. 12A and/or 12D, in some embodiments the state transitions directly to state 1237 (credential registration) with a probability of 6%, and in some embodiments, transitions to state 1231 (selecting a credential type).

The state 1231 represents selecting a credential type. For example, the page may include a drop-down menu of multiple authentication types from which a selection may be made. In some embodiments, selecting a credential type may be performed automatically by the API platform. For example, a similar or comparable process to that described with reference to block 215 of FIG. 2 may be applied. In some embodiments, the API platform may automatically select OAuth. The action to transition from the state 1231 to the state 1233 may include the selection of a credential type.

The state 1233 may represent selecting an application type. For example, the page may include a set of radio buttons with application types from which a selection may be made. For example, the type may include a web application, an Android® application, a Chrome® application, an iOS® application, a PlayStation® application, etc. In some embodiments, selecting an application type may be performed automatically by the API platform. For example, a similar or comparable process to that described with reference to block 215 of FIG. 2 may be applied. The action to transition from the state 1233 to the state 1235 may include the selection of an application type. For example, a process to identify an element with properties of class "button," id of "next" and has a "href" attribute or something similar or comparable may be followed to select the application type.

The state 1235 may represent a consent screen. For example, the consent screen may include a page with a message indicating that the project will comply with certain requirements and/or that there are certain limitations or lack of guarantees, etc. with a button indicating that the user accepts. The action to transition from the state 1235 to the state 1237 may include the confirmation of consent. For example, a process to identify an element with properties of class "button," id of "accept" and has a "href" attribute or something similar or comparable may be followed to confirm consent.

The state 1237 may include a set of fillable forms to register the credentials. For example, information regarding the client secret, client identity, etc. associated with registering the credentials may be entered at the state 1237. In some embodiments, entering such information may proceed in an automated fashion similar to that described with reference to automatically filling the fillable forms to sign up for the API illustrated in FIG. 7.

Modifications, additions, or omissions may be made to the sets of states 1200a-1200e illustrated in FIGS. 12A-12E without departing from the scope of the disclosure. For example, the designations of different elements in the manner described is meant to help explain concepts described herein and is not limiting. Further, the sets of states 1200a-1200e may include any number of other elements or may be implemented within other systems or contexts than those described. While certain state transitions and probabilities are illustrated, it will be appreciated that any number of state transitions, including those not illustrated, can occur with other probabilities than those illustrated. For example, after selecting an application type (state 1233), the state may transition directly to the state 1237 completely bypassing the state 1235.

Figure 13:
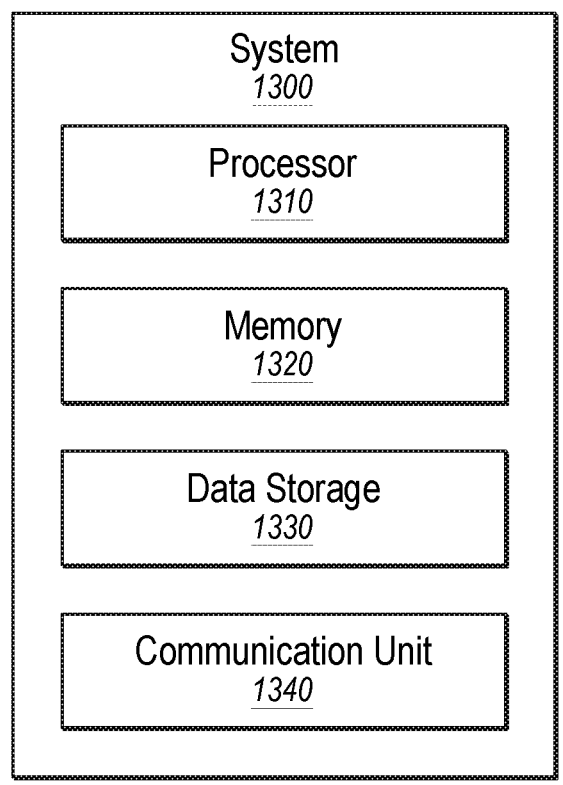
FIG. 13 illustrates an example computing system.

FIG. 13 illustrates an example computing system 1300 to facilitate accessing an API using machine learning, according to at least one embodiment described in the present disclosure. The computing system 1300 may include a processor 1310, a memory 1320, a data storage 1330, and/or a communication unit 1340, which all may be communicatively coupled. Any of the operations of the methods 200-1100 of FIGS. 2-11 may be performed by a computing system consistent with the computing system 1300. For example, the computing system 1300 may automatically register a user with, and/or grant them access to an API.

Generally, the processor 1310 may include any suitable special-purpose or general-purpose computer, computing entity, or processing device including various computer hardware or software modules and may be configured to execute instructions stored on any applicable computer-readable storage media. For example, the processor 1310 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 13, it is understood that the processor 1310 may include any number of processors distributed across any number of network or physical locations that are configured to perform individually or collectively any number of operations described in the present disclosure. In some embodiments, the processor 1310 may interpret and/or execute program instructions and/or process data stored in the memory 1320, the data storage 1330, or the memory 1320 and the data storage 1330. In some embodiments, the processor 1310 may fetch program instructions from the data storage 1330 and load the program instructions into the memory 1320.

After the program instructions are loaded into the memory 1320, the processor 1310 may execute the program instructions, such as instructions to perform any of the methods 200-1100 of FIGS. 2-11, respectively. For example, the processor 1310 may obtain instructions regarding automatically registering a user with, and/or granting them access to an API.

The memory 1320 and the data storage 1330 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1310. In some embodiments, the computing system 1300 may or may not include either of the memory 1320 and the data storage 1330.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1310 to perform a certain operation or group of operations.

The communication unit 1340 may include any component, device, system, or combination thereof that is configured to transmit or receive information over a network. In some embodiments, the communication unit 1340 may communicate with other devices at other locations, the same location, or even other components within the same system. For example, the communication unit 1340 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1340 may permit data to be exchanged with a network and/or any other devices or systems described in the present disclosure. For example, the communication unit 1340 may allow the system 1300 to communicate with other systems, such as computing devices and/or other networks.

One skilled in the art, after reviewing this disclosure, may recognize that modifications, additions, or omissions may be made to the system 1300 without departing from the scope of the present disclosure. For example, the system 1300 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   iterating over multiple application programming interfaces (APIs) to extract an authentication type for the multiple APIs;
   from a central repository, automatically registering a new user for access to a given API of the multiple APIs;
   obtaining authentication data based on an authentication type for the given API;
   storing the authentication data; and
   accessing the given API using the stored authentication data.

2. The method of claim 1, wherein automatically registering the new user comprises:
   automatically detecting a sign-up page for the given API using one of a search-engine based detection and a machine learning based detection;
   automatically filling forms on the detected sign-up page of the given API; and
   obtaining account credentials based on the filled forms of the sign-up page.

3. The method of claim 2, wherein the search-engine based detection comprises:
   generating a query for identifying one or more potential sign-up pages for the given API;
   performing an Internet search using the generated query;
   extracting one or more links from results of the search;
   iteratively searching contents of the extracted one or more links to detect sign-up forms on the contents by correlating form fields on the contents with terms in a dictionary;
   based on the correlation between the form fields and the terms in the dictionary exceeding a threshold, identifying one of the contents as the sign-up page for the given API; and
   storing a locator of the identified sign-up page.

4. The method of claim 2, wherein the machine learning based detection comprises:
   extracting data from collected sign-up pages;
   generating a trained model of sign-up pages based on the collected sign-up pages;
   obtaining an API documentation page for the given API;
   extracting links from the API documentation page;
   iteratively analyzing pages of the extracted links using the trained model of sign-up pages;
   based on the analysis, identifying a given page as the sign-up page for the given API; and
   storing a locator of the identified sign-up page.

5. The method of claim 2, wherein automatically filling forms on the detected sign-up page comprises:
   generating a trained model of potential fields of sign-up pages;
   extracting labels of fillable fields on the sign-up page;
   classifying each of the extracted labels into a category;
   providing sample values for temporary access to the given API; and
   after accessing the given API, receiving user input to change the sample values to established values.

6. The method of claim 5, further comprising:
   detecting that additional fields are unable to be filled without user input;
   prompting the new user for user input;
   receiving user input; and
   retraining the trained model of potential fields based on the received user input.

7. The method of claim 1, further comprising confirming the automatic registration of the new user, comprising:
- extracting data from collected sign-in pages;
- generating a trained model of sign-in pages based on the collected sign-in pages;
- obtaining a sign-up page for the given API;
- extracting links from the sign-up page;
- iteratively analyzing pages of the extracted links using the trained model of sign-in pages;
- based on the analysis, identifying a given page as a sign-in page for the given API;
- automatically entering stored sign-in credentials of the given API; and
- based on a successful sign-in, storing a result of the successful sign-in.

8. The method of claim 1, wherein the authentication type for the given API includes an API key, and wherein obtaining authentication data based on the authentication type comprises:
- extracting data from collected API-key pages;
- generating a trained model of API-key pages based on the collected API-key pages;
- accessing a landing page for the given API, the landing page accessed after signing-in to the given API;
- extracting links from the landing page;
- iteratively analyzing pages of the extracted links using the trained model of API-key pages;
- based on the analysis, identifying a given page as an API-key page for the given API; and
- extracting the API-key from the identified API-key page, wherein storing the authentication data includes storing the API-key as the authentication data.

9. The method of claim 1, wherein the authentication type for the given API includes OAuth, and wherein obtaining authentication data based on the authentication type comprises:
- obtaining data from application registration pages;
- obtaining annotated data regarding representative states during an application registration process;
- generating trained classifiers for each of the representative states during the application registration process using the annotated data;
- identifying one or more predefined actions associated with each of the representative states and a probability of performing each of the predefined actions when in a given representative state;
- obtaining an API documentation page of the given API as an initial state;
- iteratively transitioning between states based on the predefined actions and the probabilities of performing each of the predefined actions to traverse the application registration process; and
- based on the application registration process being complete, extracting client OAuth credentials,
- wherein storing the authentication data includes storing the client OAuth credentials as the authentication data.

10. The method of claim 9, wherein accessing the given API using the stored authentication data includes obtaining an access token based on the client OAuth credentials, obtaining the access token comprising:
- retrieving the stored client OAuth credentials;
- uploading the stored client OAuth credentials as an initial request for an access token;
- requesting an authorization code related to accessing the given API;
- receiving a request to approve permission to access the given API;
- automatically providing credentials to approve the request to approve permission;
- receiving the authorization code;
- requesting the access token based on the authorization code;
- receiving the access token;
- creating a web resource based on the access token;
- extracting the access token from the web resource;
- storing the access token; and
- accessing the API using the access token.

11. An application programming interface (API) platform, comprising:
- one or more processors; and
- one or more non-transitory computer-readable media containing instructions that, when executed by the one or more processors, cause the API platform to perform operations, comprising:
  - accessing multiple API hosting servers to iterate over multiple APIs to extract an authentication type for the multiple APIs;
  - automatically registering a new user for access to a given API of the multiple APIs with a given API hosting server hosting the given API;
  - obtaining authentication data from the API hosting server based on an authentication type for the given API;
  - storing the authentication data at the API platform; and
  - accessing, via the API platform, the given API using the stored authentication data.

12. The API platform of claim 11, wherein automatically registering the new user comprises:
- automatically detecting a sign-up page for the given API using one of a search-engine based detection and a machine learning based detection;
- automatically filling forms on the detected sign-up page of the given API; and
- obtaining account credentials from the given API hosting server based on the filled forms of the sign-up page.

13. The API platform of claim 12, wherein the search-engine based detection comprises:
- generating a query for identifying one or more potential sign-up pages for the given API;
- performing an Internet search using the generated query;
- extracting one or more links from results of the search;
- iteratively searching contents of the extracted one or more links to detect sign-up forms on the contents by correlating form fields on the contents with terms in a dictionary;
- based on the correlation between the form fields and the terms in the dictionary exceeding a threshold, identifying one of the contents as the sign-up page for the given API; and
- storing a locator of the identified sign-up page.

14. The API platform of claim 12, wherein the machine learning based detection comprises:
- extracting data from collected sign-up pages;
- generating a trained model of sign-up pages based on the collected sign-up pages;
- accessing an API documentation page for the given API at the given API hosting server;
- extracting links from the API documentation page;
- iteratively analyzing pages of the extracted links using the trained model of sign-up pages;
- based on the analysis, identifying a given page as the sign-up page for the given API; and
- storing a locator of the identified sign-up page.

15. The API platform of claim 12, wherein automatically filling forms on the detected sign-up page comprises:
 generating a trained model of potential fields of sign-up pages;
 extracting labels of fillable fields on the sign-up page;
 classifying each of the extracted labels into a category;
 providing sample values for temporary access to the given API; and
 after accessing the given API, receiving user input to change the sample values to established values.

16. The API platform of claim 11, wherein the operations further comprise confirming the automatic registration of the new user, the operation of confirming the automatic registration comprising:
 extracting data from collected sign-in pages;
 generating a trained model of sign-in pages based on the collected sign-in pages;
 obtaining a sign-up page for the given API;
 extracting links from the sign-up page;
 iteratively analyzing pages of the extracted links using the trained model of sign-in pages;
 based on the analysis, identifying a given page as a sign-in page for the given API;
 automatically entering stored sign-in credentials of the given API; and
 based on a successful sign-in, storing a result of the successful sign-in.

17. The API platform of claim 11, wherein the authentication type for the given API includes an API key, and wherein obtaining authentication data based on the authentication type comprises:
 extracting data from collected API-key pages;
 generating a trained model of API-key pages based on the collected API-key pages;
 accessing a landing page for the given API, the landing page accessed after signing-in to the API;
 extracting links from the landing page;
 iteratively analyzing pages of the extracted links using the trained model of API-key pages;
 based on the analysis, identifying a given page as an API-key page for the given API; and
 extracting the API-key from the identified API-key page, wherein storing the authentication data includes storing the API-key as the authentication data.

18. The API platform of claim 11, wherein the authentication type for the given API includes OAuth, and wherein obtaining authentication data based on the authentication type comprises:
 obtaining data from application registration pages;
 obtaining annotated data regarding representative states during an application registration process;
 generating trained classifiers for each of the representative states during the application registration process using the annotated data;
 identifying one or more predefined actions associated with each of the representative states and a probability of performing each of the predefined actions when in a given representative state;
 obtaining an API documentation page of the given API as an initial state;
 iteratively transitioning between states based on the predefined actions and the probabilities of performing each of the predefined actions to traverse the application registration process; and
 based on the application registration process being complete, extracting client OAuth credentials,
 wherein storing the authentication data includes storing the client OAuth credentials as the authentication data.

19. The API platform of claim 18, wherein accessing the given API using the stored authentication data includes obtaining an access token based on the client OAuth credentials, obtaining the access token comprising:
 retrieving the stored OAuth credentials;
 uploading the stored OAuth credentials as an initial request for an access token;
 requesting an authorization code related to accessing the given API;
 receiving a request to approve permission to access the given API;
 automatically providing the credentials to approve the request to approve permission;
 receiving the authorization code;
 requesting the access token based on the authorization code;
 receiving the access token;
 creating a web resource based on the access token;
 extracting the access token from the web resource;
 storing the access token; and
 accessing the API using the access token.

20. One or more non-transitory computer-readable media containing instructions that, when executed by one or more processors, cause a system to perform operations, comprising:
 iterating over multiple application programming interfaces (APIs) to extract an authentication type for the multiple APIs;
 from a central repository, automatically registering a new user for access to a given API of the multiple APIs;
 obtaining authentication data based on an authentication type for the given API;
 storing the authentication data; and
 accessing the given API using the stored authentication data.

* * * * *